US007587303B2

(12) United States Patent
De Hillerin et al.

(10) Patent No.: US 7,587,303 B2
(45) Date of Patent: Sep. 8, 2009

(54) NON-LINEAR SOLVER FOR A FLEXIBLE SLENDER-BODY SYSTEM

(75) Inventors: Charles-André De Hillerin, Saint Cloud (FR); Sébastien Voegele, Blagnac (FR)

(73) Assignee: Dassault Systemes, Suresnes Cedex (FR)

( * ) Notice: Subject to any disclaimer, the term of this patent is extended or adjusted under 35 U.S.C. 154(b) by 285 days.

(21) Appl. No.: 11/400,487

(22) Filed: Apr. 6, 2006

(65) Prior Publication Data

US 2007/0064016 A1 Mar. 22, 2007

(30) Foreign Application Priority Data

Apr. 8, 2005 (EP) .................................. 05290790

(51) Int. Cl.
*G06F 17/50* (2006.01)
(52) U.S. Cl. ................................ 703/2; 703/7; 345/419
(58) Field of Classification Search .................... 703/2, 703/6, 7; 345/419–475; 382/128
See application file for complete search history.

(56) References Cited

U.S. PATENT DOCUMENTS

| 6,690,816 | B2 * | 2/2004 | Aylward et al. | 382/128 |
| 2002/0088931 | A1 * | 7/2002 | Danisch et al. | 250/227.14 |
| 2006/0098007 | A1 * | 5/2006 | Rouet et al. | 345/419 |

OTHER PUBLICATIONS

De Hillerin, Charles-Andre, "Use of the FEM for the Design of Flexible Parts" Proceedings of NAFEMS World Congress, XX, XX, vol. 1, Apr. 25, 1999, pp. 345-356, XP009052130.

Toi, Yukata, et al., "Finite element analysis of superelastic, large deformation behavior of shape memory alloy helical springs", Computers & Structures, Aug. 2004, vol. 82, No. 20-21, pp. 1685-1693, XP002350964.

* cited by examiner

*Primary Examiner*—Thai Phan
(74) *Attorney, Agent, or Firm*—Isabel Cantallops; Baker & Hostetler LLP

(57) ABSTRACT

For determining the behavior of a flexible system submitted to predetermined displacement boundary conditions, a process uses geometrically non-linear finite element analysis. The process has a plurality of incremental steps within a total Lagrangian formalism with co-rotational update.

In each incremental step, one computes for a finite element of the flexible system a displacement vector, having translational and rotational components, at the nodes of the finite element. This computation of the displacement vector is carried out by minimizing the energy of the flexible system when the system is submitted to a fraction of the predetermined displacement.

For a given finite element, the co-rotational update is carried out by computing an updated elementary frame of reference, without considering the bending rotational components of the displacement vectors computed at the nodes of the finite element.

The properties of this co-rotational update make all computations similar, hence simpler and easier.

18 Claims, 18 Drawing Sheets

NON-LINEAR SOLVER FOR A FLEXIBLE SLENDER-BODY SYSTEM

CROSS REFERENCE TO RELATED APPLICATIONS

This application claims priority to European Patent Application No. 05290790.4 filed on Apr. 8, 2005.

FIELD OF THE INVENTION

The invention relates to the field of computer programs and systems, more specifically to part design programs and such constraints-based systems.

BACKGROUND OF THE INVENTION

A number of systems and programs are offered on the market for the design of parts or assemblies of parts, such as the one provided by the applicant under the trademark CATIA. These so-called computer-aided design (CAD) systems allow a user to construct and manipulate complex three-dimensional (3D) models of parts or assemblies of parts. These systems and programs use various constraints for defining models. The set of constraints is solved by the system when the model is edited. The program or system used for solving the set of constraints is generally called a "solver". Such solvers are used in CAD/CAM/CAE systems or more generally in any system using constraints for defining objects of any kind. A solver is adapted to the objects being designed and to the type of constraints applied to these objects. A solver such as the one used in CATIA is adapted for the design of solid objects, with constraints comprising dimensional constraints, stresses, contacts between objects and the like.

There is a need for a solver making it possible to simulate the deformed shapes of slender-body flexible solid physical systems such as cables, hoses, tubes, pipes, belts, foils, gaitors, ribbons, harnesses, chains, wires, ropes, strings, beams, rods, shafts, springs, etc, alone or in combination. Usual solvers are not always adapted to describing the constraints of such slender-body flexible systems; compared to objects usually designed in CAD/CAM/CAE systems, slender-body flexible systems are characterized by the fact that their aspect ratio (AR=largest dimension/mean value of smaller dimensions, i.e.: length/mean cross-section diameter) is typically high (e.g.: AR>5); in other words, their shape can be described by a curve ("neutral line") along with transverse cross-section characteristics. This feature is representative of the fact that the system consists of slender bodies.

Another difference between such slender-body flexible systems and the objects usually designed in CAD/CAM/CAE systems is their high deformability ("geometrical non-linearity") in the sense that distinct points on the neutral line can independently undergo arbitrarily large rotations under the action of loads. In other words, for slender-body flexible systems, the deformed shape of the system may substantially differ from the non-deformed shape of the system. On the contrary, geometrically linear solvers in existing CAD/CAM/CAE systems work under the assumption that the deformed shape of the object is close to the non-deformed shape. More generally, systems undergoing large rotations, such that the rotation angles in radians cannot be approximated by the tangent—typically 5 degrees, but this figure may vary depending on the amount of modeling error tolerated—are usually considered as "geometrically non-linear systems". Alternatively, one could say that a system is non-linear when a "large strain" definition such as the Green-Lagrange measure:

$$\varepsilon_{ij}^{GL} = \frac{1}{2}\left[\frac{\partial u_i}{\partial X_j} + \frac{\partial u_j}{\partial X_i} + \frac{\partial u_k}{\partial X_i}\frac{\partial u_k}{\partial X_j}\right]$$

cannot be replaced by the "small strain" definition of the strain tensor components:

$$\varepsilon_{ij}^{LIN} = \frac{1}{2}\left(\frac{\partial u_i}{\partial X_j} + \frac{\partial u_j}{\partial X_i}\right)$$

that is when the product term in the Green-Lagrange measure $$\frac{\partial u_k}{\partial X_i}\frac{\partial u_k}{\partial X_j}$$

cannot be neglected

The need for a solver adapted to slender-body flexible systems is particularly present in automotive and aerospace industries. In both industries, there is a need to design and simulate cables, pipes etc. throughout the body of the vehicle or plane.

*Use of the FEM for the Design of Flexible Parts*, Charles-André de Hillerin, Proceedings of NAFEMS World Congress 1999, pp. 345-356, discusses simulating of the behavior of highly flexible components by using integrated CAD-CAE tools. This document describes a method for computing the equilibrium shapes of a flexible cable of arbitrary cross-section, subjected to prescribed end positions and orientations, based on an incremental total Lagrangian formulation, with controlled co-rotational updating. The solution is obtained with a direct gradient method by performing an exact line search at each iteration.

This document does not teach how to carry out the co-rotational updating in the incremental total Lagrangian formulation. In addition, this document only encompasses prescribed end positions, and does not contemplate any release of the degree of freedom of the system at the end positions. Last, the starting cable configuration in this document is a rectilinear rest shape of the flexible elongated system.

Y. Toi et al, *Finite element of superelastic, large deformation behaviour of shape memory alloy helical springs*, Computers and Structures 82 (2004), 1685-1693, discusses a finite element analysis, using a total Lagrangian approach. There is no reference whatsoever in this document of a co-rotational update. Indeed, in page 1688, right column, section 3.2, this document indicates that the non-linear terms with respect to the displacement in the axial direction are neglected. This indicates that non-linear terms for the rotational displacements will not be neglected; otherwise, the problem would become a totally linear problem, which would not require the non-linear iterative computation discussed in the document. In view of this, co-rotational update need not be carried out.

SUMMARY OF THE INVENTION

According to the invention, there is provided a process for determining the behavior of a flexible system submitted to predetermined displacement boundary conditions, using geometrically non-linear finite element analysis, the process comprising a plurality of incremental steps within a total Lagrangian formalism with co-rotational update, wherein each incremental step comprises computing for a finite element of the flexible system a displacement vector, having translational and rotational components, at the nodes of the finite element, by minimizing an energy of the flexible system when submitted to a fraction of the predetermined displacement; and wherein, for a given finite element, the co-rotational update comprises computing an updated elementary frame of reference without considering the bending rotational components of the displacement vectors computed at the nodes of the finite element.

In one embodiment, the co-rotational update comprises computing updated elementary frame of reference solely on the basis of the translational components of the displacement vectors computed at the nodes of the finite elements. In this case, the updated elementary frame of reference may be computed with the steps of extracting a minimal rotation necessary for bringing a line joining the nodes of the finite element on a line joined displaced nodes of the finite element;

applying said minimal rotation to the elementary frame of reference of said finite element before said co-rotational update.

In another embodiment, the co-rotational update comprises computing updated elementary frame of reference on the basis of a mean value of a torsional rotational component of the displacement vectors computed at the nodes of the finite element, and the translational components of the displacement vectors computed at the nodes of the finite element.

In this case, the updated elementary frame of reference may be computed with the steps of rotating the elementary frame of reference of said finite element before said co-rotational update around an axis coinciding with the line joining the nodes, by a mean value of the torsional rotational components of the nodes;

extracting a minimal rotation necessary for bringing a line joining the nodes of the finite element on a line joined displaced nodes of the finite element ; and applying said minimal rotation to the rotated elementary frame of reference.

It is preferred that the axis of the updated elementary frame of reference coincides with a line joining nodes of displaced finite element.

In yet another embodiment, a node of a finite element is provided with a nodal frame of reference and the incremental step fuirther comprises computing, for a displaced node of the finite element, an updated nodal frame of reference by rotating the nodal frame of reference by the rotational components of the displacement vector at the node. One may then provide a step of interpolating a smoothed shape for the flexible system, based on the positions of the nodes for the finite elements and
the nodal frames of reference.

The interpolated smooth shape may then be displayed.

In an embodiment of the process, the minimized energy of the flexible system is a function of the difference between a nodal frame of reference at a node and an elementary frame of reference of a finite element comprising the node.

In this instance, the process may further comprise, during an incremental step, computing at a node of finite element a rotation transforming an elementary frame of reference into the nodal frame of reference; minimized energy would then depend on the computed rotation.

Preferably, the minimized energy of the flexible system is a function of the product of a scaling factor by the difference between a nodal frame of reference at a node and an elementary frame of reference of a finite element comprising the node, the process further comprising changing the scaling factor from one incremental step to another incremental step. It is possible to provide that the scaling factor is changed manually;

the scaling factor is changed according to a number of iterations for minimizing the energy in an incremental step; or that the scaling factor is changed according to the difference between an elementary frame of reference for a finite element and the nodal frames of reference for the finite element.

In yet another embodiment, the step of minimizing the energy is carried out iteratively and comprises:

computing a scalar product of a residual and of a displacement variation and stopping the iterations according to a value of the scalar product.

One may further provide that the predetermined displacement boundary conditions include at least one degree of freedom release at one node of the flexible system; the step of minimizing is then carried out, for a node having a released degree of freedom, in a local frame of reference. A released degree of freedom at said node may then be expressed along one axis of the local frame of reference.

Last, the invention provides a computer program product residing on a computer-readable medium, comprising computer program code means adapted to run on a computer all the steps of such a process.

A system embodying the invention will now be described, by way of non-limiting example, and in reference to the accompanying drawings.

DETAILED DESCRIPTION OF THE INVENTION

The invention first proposes a solution to the co-rotational updating in the prior art incremental total Lagrangian formulation. For the sake of clarity, the process disclosed in the NAFEMS World Congress paper (thereafter the NAFEMS paper) is discussed again here. In the first part of the present description, one considers the case where the predetermined reference displacement of the flexible system at both ends is fully determined.

The purpose of the process is to determine the behavior of the flexible system, when submitted to predetermined displacement boundary conditions. Reference 2 in FIG. 1 designates the starting configuration of the flexible system. At both ends of the system, frames of reference 4 and 6 are represented. These frames of reference are local frames of reference and are representative of the orientation of the flexible system at both ends. One understands that the word "displacement" thus includes not only the position of the ends of the flexible system, but also the orientation of the flexible system. Displacement of a point thus includes six degrees of freedom.

Figure 1:
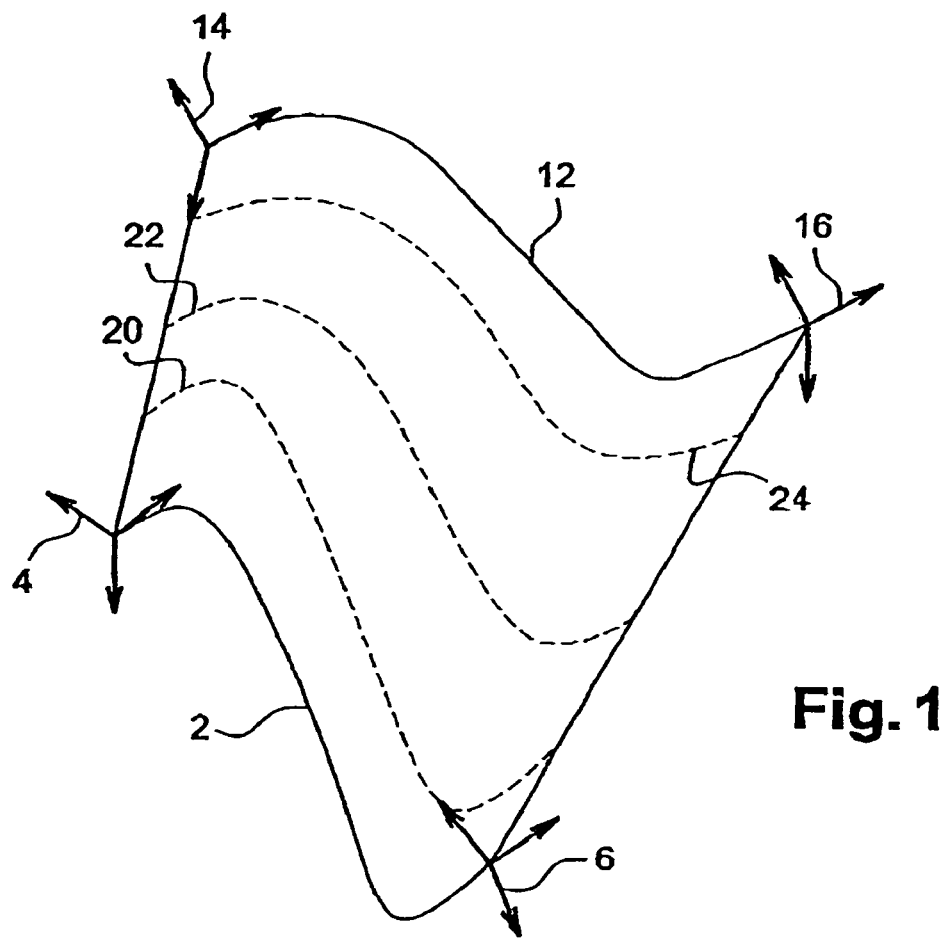
FIG. 1 is a schematic view of the flexible system, in the starting configuration and in the final configuration, showing a number of intermediate configurations.

Reference 12 in FIG. 1 designates the final configuration of the flexible system, while references 14 and 16 designate the reference frames at both ends of the flexible system. At the first end—reference frames 6 and 16—the displacement includes a displacement in position, the axis of reference frames 6 and 16 being parallel. At the second end—reference frames 4 and 14—the displacement includes a displacement in position and orientation, the axis of reference frame 14 being turned compared to the axis of reference frame 4.

FIG. 1 further shows interim configurations 20, 22 and 24 of the flexible system. The number of interim configuration in FIG. 1 is solely selected for the purposes of explanation. For passing from one configuration to the next one—which represents one incremental step—a fraction of the predetermined displacement is applied to the flexible system. In the example of FIG. 1, with three interim configurations and therefore four incremental steps, one passes from one configuration to the next one by applying to the flexible system one fourth of the predetermined displacement. For instance, in the first incremental step, one passes from the initial configuration 2 to the first interim configuration 20, by applying to the ends of the flexible system one fourth of the predetermined displacement—in translation and in rotation.

Figure 2:
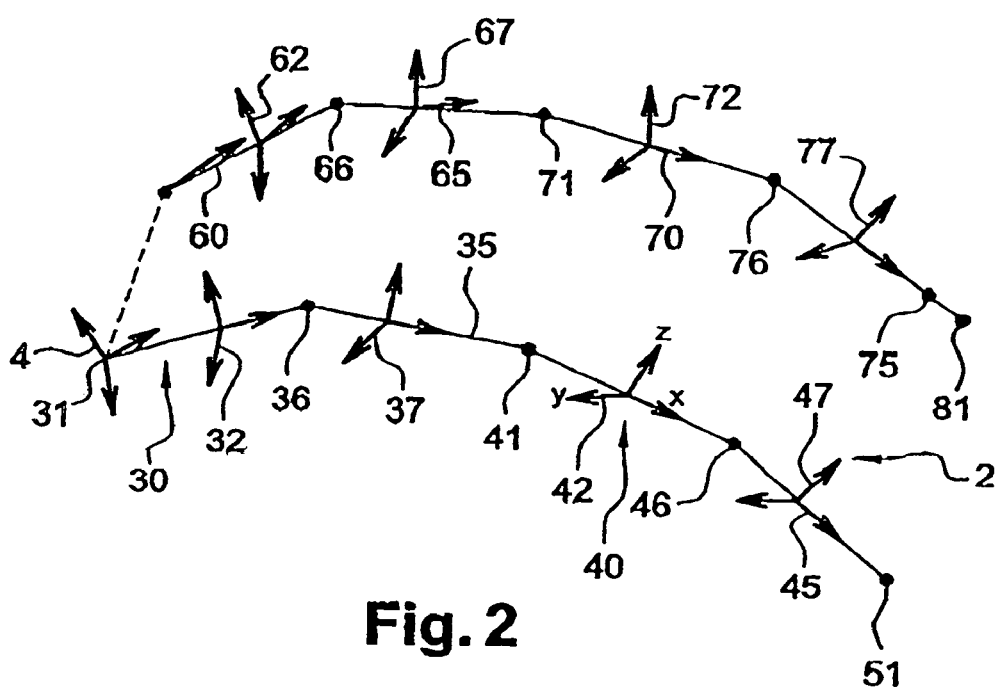
FIG. 2 is a partial view representation of the finite element model for the flexible system, in the starting configuration and in the first interim configuration.

Each interim configuration and the final configuration of the flexible system is computed using geometrically non-linear finite element analysis; specifically, the flexible system is represented as a series of finite elements. For the sake of explanation, the first incremental step is considered: in this first incremental step, one passes from the starting configuration 2 to the first interim configuration 20. FIG. 2 shows a partial view of the starting configuration 2 with the reference frame 4 and some of the elements. It shows a number of elements 30, 35, 40, 45; each element extends between two nodes 31, 36, 41, 46 and 51. Node 31 is actually the end of the flexible system. Each element 30, 35, 40, 45 is associated with an elementary frame of reference, referenced 32, 37, 42 and 47 on FIG. 2. FIG. 2 further shows a partial view of the first interim configuration 20, each of the nodes; elements and frames of reference having a reference number increased by 30.

In each incremental step, one minimizes the total potential energy of the flexible system, when submitted to the fraction of the predetermined displacement. The total potential energy of the flexible system is computed as the sum of the total potential energy of each of the finite elements forming the flexible system. This is carried out thanks to an iterative process discloses in the NAFEMS article. This iterative process may also be carried out as discussed below.

In each incremental step, one uses a total Lagrangian formalism with co-rotational update. As discussed in section 4.3.2.1 of the NAFEMS article, displacements within a given incremental step—or "palier" in the wording used in the NAFEMS article—are measured relative to the configuration corresponding to the solution obtained in the previous incremental step. In other words, in one incremental step, minimization of the total potential energy of the flexible system is carried out, for each element, in the elementary reference frame associated to the element in the configuration of the flexible system at the beginning of the incremental step. In the example of FIG. 2, the configuration at the beginning of the incremental step is the starting configuration 2. One will therefore iteratively minimize the total potential energy of the flexible system for obtaining the first interim configuration, in the frames of reference corresponding to the starting configuration—that is in elementary frames of reference 32, 37, 42 and 47 of FIG. 2.

However, for the next incremental step, one will consider the updated frames of reference, corresponding to the first interim configuration. In other words, the following incremental step passes from first interim configuration 20 to second interim configuration 22. Computation of the second incremental step is carried out in the elementary frames of references 62, 67, 72 and 77 associated with the first interim configuration. This makes it necessary to compute new frames of references at the end of each incremental step, before the next incremental step. The NAFEMS article does not provide any detail on the computation of the updated reference frame for each element. In other words, even through co-rotational update is suggested, no explanation is provided as regards the carrying out of this co-rotational update.

The invention suggests proceeding with the co-rotational update for one given finite element, based on the components of the displacement vectors computed at the nodes of the finite element, without considering the bending rotational components of the displacement vectors.

The solution of the invention has the advantage of ensuring that in the updated elementary frame of reference, one of the axes is parallel to the line joining the nodes of the finite element. This property is maintained in each incremental step and makes all computations similar, hence simpler and easier.

Figure 3:
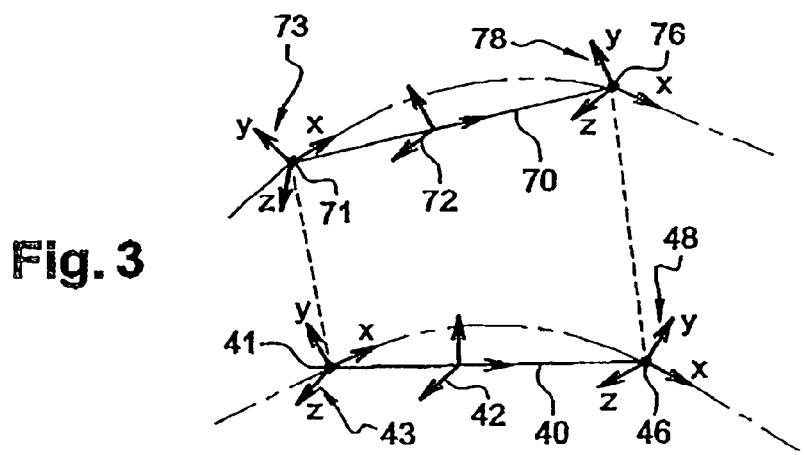
FIG. 3 is an enlarged view of a finite element of FIG. 2.

FIG. 3 is an enlarged view of finite element 40 and 70 of FIG. 2. It shows the nodes 41 and 46 in the starting configuration, with finite element 40 extending between nodes 41 and 46. The elementary frame of reference 42 of finite element 40 has axes x, y and z. The x-axis is parallel to the line joining nodes 41 and 46.

Minimizing the total potential energy of the flexible system provides a displacement vector for each node of the flexible system. The displacement vector comprises translational components $(u_x, u_y, u_z)$ and rotational components $(\theta_x, \theta_y, \theta_z)$. The translational components $(u_x, u_y, u_z)$ are representative of the displacement in position of each node; the translational component is easily understood and in the example of FIG. 3 corresponds to the displacement in position of node 41 to node 71, or of node 46 to 76.

The rotational components $(\theta_x, \theta_y, \theta_z)$ are representative of the displacement in orientation of each node; this rotational component is representative of the fact that the system is a flexible system, so that the orientation of the system at a given node would change in one incremental step.

The rotational components include bending rotational components, which are representative of the bending applied to the flexible system at a given node in the configuration obtained at the end of the incremental step.

The rotational components further include a torsional rotational component, which is representative of the torsion applied to the flexible system at the given node.

If the rotational components $(\theta_x, \theta_y, \theta_z)$ at node 41 are expressed in the frame of reference 42 of element 40—in which the x-axis is parallel to the line extending from node 41 to node 46, the torsional component is the component $\theta_x$ measured along axis x. The bending rotational components are components $\theta_y$ and $\theta_z$. In other words, bending rotational components are representative of the rotation of a node along axes transverse to the x-axis of the elementary frame of reference, which is parallel to the line joining the nodes of the finite element.

The torsional rotational component is $\theta_x$ and is representative of the torsion applied at the node the along the x-axis of the elementary frame of reference.

In a first embodiment of the invention, the updated elementary frame of reference is computed solely based on the translational components of the displacement vectors at the nodes of the finite element. This embodiment is adapted to flexible systems which deform in two dimensions only; in such cases, the flexible system is not submitted to any torsional rotational constraint, but only bends in the 2D plane. An example of such a plane deformation is provided by a horizontal beam clamped at both ends, acted upon by gravity and subjected to an imposed horizontal compressive displacement at one end.

In this case, the updated elementary frame of reference may be computed as follows. One considers, in the configuration at the beginning of the incremental step, a finite element $P_1P_2$ joining two nodes $P_1$ and $P2$. The elementary frame for this finite element has three axes x, y and z. The x-axis is parallel to the line $(P_1P_2)$ joining the two nodes. The y-axis is perpendicular to the x-axis in the 2D plane. The z-axis is perpendicular to the 2D-plane.

Let $(u_{x1}, u_{y1}, u_{z1})$ be the translational components of the displacement vector computed at the first node $P_1$ of the finite element and measured in the elementary reference frame of the finite element. Let $(\theta_{x1}, \theta_{y1}, \theta_{z1})$ be the rotational components of the displacement vector computed at the first node $P_1$ of the finite element. Similarly, let $(u_{x2}, u_{y2}, u_{z2})$ and $(\theta_{x2}, \theta_{y2}, \theta_{z2})$ be the rotational and translational components of the displacement vector for the second node $P_2$, measured in the elementary reference frame of the finite element. $P_1'$ and $P_2'$ are the displaced nodes, computed in the incremental step.

Since the flexible system in the 2D case does not have any torsional constraint, $\theta_{x1}=\theta_{x2}=0$. The torsional rotational constraints at the first and second nodes are zero. The flexible system moves within the 2D plane, so that $u_{z1}=u_{z2}=0$.

The bending rotational component of the displacement vectors at the first and second nodes are thus expressed by $\theta_{z1}$ and $\theta_{z2}$.

In this embodiment, the updated elementary frame of reference is computed as follows. The x-axis of the elementary frame of reference is set parallel to the line $(P_1'P_2')$ joining displaced nodes $P_1'$ and $P_2'$. The x-axis is oriented in the direction from $P_1'$ to $P_2'$. The y-axis is perpendicular to the x-axis, in the 2D plane where the flexible system is moving. The z-axis is again perpendicular to the 2D plane. For computing the updated elementary frame of reference, the rotational components of the displacement vectors are not taken into account.

In a second embodiment of the invention, the updated elementary frame of reference is computed based on the translational components and on the torsional rotational component of the displacement vectors at the nodes of the finite element. This embodiment is adapted to flexible systems which deform in three dimensions. This would for instance apply to cables, for which a torsional constraint applied to the cable results in a 3D deformation of the cable, and more generally to any situation where a straight neutral line deforms into a non-planar curve.

The displacement vectors for the nodes $P_1$ and $P_2$ are referenced as in the first embodiment; in this embodiment, there is no reason to assume that $\theta_{x1}=\theta_{x2}=0$ or $u_{z1}=u_{z2}=0$. The updated elementary frame of reference is computed as follows. One first considers the torsional component $\theta_{x1}$ and $\theta_{x2}$ of nodes $P_1$ and $P_2$. The updated elementary frame of reference is computed by applying to the elementary frame of reference a rotation along the x-axis—that is along the line $(P_1\ P_2)$ joining nodes $P_1$ and $P_2$—having an angle equal to the mean torsional rotational component $(\theta_{x1}+\theta_{x2})/2$ of the nodes $P_1$ and $P_2$, applying to the rotated frame a rotation equal to the minimal rotation that turns a unitary vector directed from node $P_1$ to node $P_2$ into a unitary vector directed from node $P_1'$ to node $P_2'$; this rotation is computed based on the translational components $(u_{x1}, u_{y1}, u_{z1})$ and $(u_{x2}, u_{y2}, u_{z2})$ of the displacement vectors, and does not take into account the rotational components $(\theta_{x1}, \theta_{y1}, \theta_{z1})$ and $(\theta_{x2}, \theta_{y2}, \theta_{z2})$ of the displacement vectors.

In other words, the elementary frame of reference used during the incremental step is first rotated by an amount corresponding to the mean torsional rotational component applied to the node, and the rotated frame is then further rotated so that the x-axis of the updated elementary frame of reference is parallel to the line $(P_1'P_2')$ joining the transformed nodes $P_1'$ and $P_2'$.

As in the first embodiment, the x-axis of the updated frame of reference is parallel to the line joining the displaced nodes $P_1'$ and $P_2'$; however, contrary to the first embodiment, the y- and z-axes are rotated to take into account the torsional displacement applied to the nodes, so that the xy-plane has no reason of remaining constant.

In both embodiments, the updated elementary frame of reference is computed without considering the bending rotational components of the displacement vectors at the node of the finite element. Also, in both embodiments, the x-axis of the elementary frame of reference remains parallel to the line joining the nodes of the finite element.

The process disclosed above provides, for each finite element, an updated frame of reference. This updated frame of reference may be used for the iterative computation in the next incremental step. The update of the elementary frames of reference ensures that the approximation used in the finite element analysis remains valid. Specifically, the cable kinematics $$u(x, y, z) = u^0(x) - y \cdot \theta_z(x) + z \cdot \theta_y(x)$$

$$v(x, y, z) = v^0(x) - z \cdot \theta_y(x)$$

$$w(x, y, z) = w^0(x) + y \cdot \theta_z(x)$$

disclosed in section 4.1.1.1 of the NAFEMS article remains valid while rotations $\theta_y$ and $\theta_z$ are small enough, so that $\sin \theta \approx \theta$; this assumption is valid when the elementary frames of reference are updated as discussed above.

The co-rotational update of the elementary frames of reference does not take into account the bending components of the displacement vectors at each of the nodes. The bending components of the displacement vectors are taken into account thanks to the process of updating nodal reference frames.

In addition, the incremental step provides a finite element representation of the flexible system, which is a slope-discontinuous representation of the system. For obtaining a smooth—and slope-continuous—representation of the flexible system, the invention suggests using nodal frames of reference. A nodal frame of reference is associated with each node of the flexible system. The nodal frames are updated separately from the elementary frames of reference, by taking into account the bending rotational components of the displacement vectors.

FIG. 3 further shows the nodal frames of reference. In the starting configuration 2, nodal frames of reference are defined as follows:

the x-axis of each nodal frame of reference is tangent to the flexible system;

the y-axis of each nodal frame of reference is representative of the torsion of the cable system along the neutral line; in other words, one selects a given arbitrary direction of the y-axis at one end of the flexible system, e.g. at the first node 31. For the next node, the y-axis is determined as being perpendicular to the y-axis, taking into account the torsional constraint applied to the flexible system. Thus, if the flexible system is without any torsion in a plane, the y-axes for the various nodal frames of reference either lie all in the plane or are all orthogonal to the plane;

the z-axis of each nodal frame of reference is such that all axes of a frame are perpendicular.

At each incremental step, nodal frames of reference are updated as follows. The nodal frame of reference at node $P_1$ is updated by being rotated by the rotational components $(\theta_{x1},$ $\theta_{y1}$, $\theta_{z1}$) of the displacement vector at the node. The origin of the updated nodal frame of reference is at the displaced node $P_1'$. This is represented in FIG. 3, with nodal frames of reference 43 and 48 for nodes 41 and 46 respectively, as well as nodal frames of reference 73 and 78 for nodes 71 and 76 respectively. FIG. 3 further shows, in interrupted lines with two dots, the smoothed configuration of the flexible system. The update of the nodal frames of reference takes into account the bending and torsional rotational components of the displacement vector.

Providing the nodal frames of reference makes it possible, at each incremental step, to compute the shape of the flexible system. The shape of the flexible system is computed, based on the positions of the nodes and on the nodal reference frames. Specifically, the shape of the flexible system is interpolated using the position of the nodes and the nodal frames of reference at the various nodes. The following rules of interpolation may be used:

- the flexible system should pass through each node;
- at each node, the flexible system should be tangent to the x-axis of the nodal frame of reference;
- at each node, the y-axis and z-axis are representative of the torsional constraints applied to the cable.

For interpolating the shape of the flexible system, one may for instance use state of the art interpolation tools, such as cubic spline interpolation.

The step of interpolating is preferably carried out before displaying to a user the deformed shape of the flexible system. Thus, the user may be provided with a smoothed view of the deformed flexible system, and not with a finite element view of the flexible system.

In each incremental step, the initial stresses applied to the flexible system at the beginning of the step may be taken into consideration, thanks to the nodal frames of reference. As explained above, the elementary frames of reference are updated without taking into account the bending rotational components of the displacement vectors applied to the nodes of finite elements. On the other hand, the nodal frames of reference are updated based on all rotational components of the displacement vectors applied to the nodes. After updating the elementary frames and reference and the nodal frames of reference, the angular difference at one node between the elementary frame of reference—on one side of the other of the node—and the nodal frame of reference is representative of the amount of the bending rotational components. This difference is also representative of the amount of initial stresses applied to the flexible system.

The invention also suggests using the nodal frames of reference as a means of measuring the initial stresses applied to the flexible system at the beginning of an incremental step. This is carried out by comparing, at each node of each finite element of the flexible system, the nodal frame of reference to the elementary frame of reference of the finite element. The comparison—or the difference between nodal frames of reference and elementary frames of reference—is representative of the initial stresses applied to the flexible system. One possible comparison consists in computing the rotation transforming an elementary frame of reference into a nodal frame of reference. The angle of this rotation is representative of the nodal initial stresses and may be used for computing the corresponding contribution to the energy to be minimized during the incremental step. One may consider either the differences at one given node between the nodal frame of reference and the elementary frame of reference for the two finite elements comprising the node. Alternatively, one may consider the differences between the elementary frame of reference for a given element and the nodal frames of reference of the nodes forming the finite element. Both examples amount to the same result or to proportional results, when the difference is summed over the whole flexible system.

For instance, for plane motion in the x-y plane, one may use the following formula for the elementary strain energy:

$$W^{int} = (EI_{zz}/2L^3) \begin{bmatrix} 12((\Delta v)^2 - L\Delta v((\theta_{z1} + \theta_{z1}^0) + (\theta_{z2} + \theta_{z2}^0)) + \\ 4L^2((\theta_{z1} + \theta_{z1}^0)^2 + (\theta_{z1} + \theta_{z1}^0)(\theta_{z2} + \theta_{z2}^0) + (\theta_{z2} + \theta_{z2}^0)^2 \end{bmatrix}$$

In this formula, the superscripted terms are representative of the angular difference, at the element nodes, between the nodal frames of reference and the corresponding elementary frame of reference at the beginning of the incremental step. The non-superscripted terms are representative of the current iteration nodal displacements.

The use, in the energy to be minimized, of terms representative of the difference between nodal frames of reference and elementary frames of reference, may cause instabilities in the computation of the behavior of the flexible system; such instabilities appear as wide changes in the shape of the flexible system from one incremental step to the next. The use of such terms may also make it more difficult to find a converged solution during an incremental step.

For avoiding or limiting these problems, the corresponding term or terms may be multiplied by a scaling factor $\mu_{IS}$; the scaling factor is comprised between 0 and 1. The exemplified formula for the elementary strain energy would then become $$W^{int} = (EI_{zz}/2L^3) \begin{bmatrix} 12((\Delta v)^2 - L\Delta v((\theta_{z1} + \mu_{IS}\theta_{z1}^0) + (\theta_{z2} + \mu_{IS}\theta_{z2}^0)) + \\ 4L^2((\theta_{z1} + \mu_{IS}\theta_{z1}^0)^2 + \\ (\theta_{z1} + \mu_{IS}\theta_{z1}^0)(\theta_{z2} + \mu_{IS}\theta_{z2}^0) + (\theta_{z2} + \mu_{IS}\theta_{z2}^0)^2 \end{bmatrix}$$

When the scaling factor $\mu_{IS}$ is 1, initial stresses are taken into account; when the scaling factor $\mu_{IS}$ is 0, the initial stresses are not taken into account. The scaling factor gas is preferably changed over the incremental steps, according to the results. One would typically decrease the scaling factor when no converged solution may be found during an incremental step, or when the flexible system proves to be unstable. This may be carried out by the user; alternatively, the scaling factor could be adapted automatically, e.g. according to the current number of iterations in the incremental step. In another embodiment, the scaling factor depends on the value of the difference between the mean nodal frame of reference of an element (average of the nodal frames of reference at its end nodes) and its elementary frame of reference; this embodiment uses the fact that a small difference is also indicative of the convergence of the results of the iterative process in the incremental step; in other words, the smaller the difference, the better the finite element simulates the behavior of the flexible system.

Figure 4:
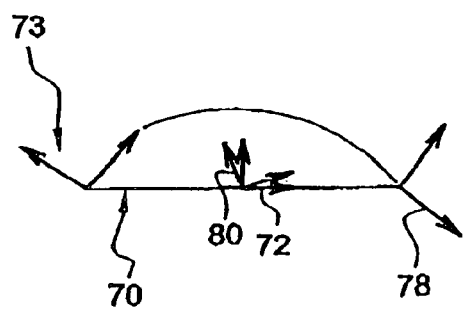
FIGS. 4 and 5 are view of a finite element with various reference frames.
Figure 5:
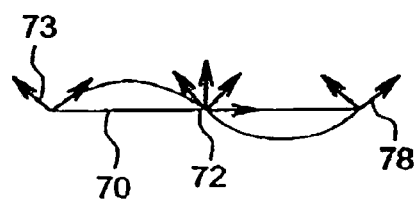

FIGS. 4 and 5 show examples of a finite element at the end of an incremental step. Both figures are in 2D for the sake of explanation and show the finite element 70, nodal frames 73 and 78, elementary frame 72, as well as a mean nodal frame 80. As explained above, the mean nodal frame is computed as the average of the nodal frames; the origin is the middle of the nodes—thus being the same origin as the elementary frame. Each vector of the mean nodal frame is the normalized sum of the corresponding vectors of the nodal frames. In FIG. 4, the angular difference between the elementary frame 72 and the mean nodal frame 80 is small—some degrees in the example. This is representative of a good convergence and of a correct selection of the $\mu_{IS}$ scaling factor. In FIG. 5, the angular difference between the elementary frame 72 and the mean nodal frame 80 is important—around 45°—which is representative of a too high value of the $\mu_{IS}$ scaling factor. In a three-dimensional example, the difference between the mean nodal frame and the elementary frame of reference may be computed as the angle of the rotation transforming the elementary frame of reference into the mean nodal frame. A value of this angle less than 10° is representative of a correct value of the scaling factor and of appropriate convergence.

As discussed above, in each incremental step, one proceeds with an iterative search for equilibrium solutions. Each iteration is a two-phase process; the first phase of the process consists in finding a descent direction over the energy surface; the second phase of the process consists in line-searching the descent direction for finding an optimal step. The finding of an optimal step requires a stopping criterion; section 4.3.2.4 of the NAFEMS paper suggests evaluating at each iteration the residual vector and the total energy. Separate convergence checks are then performed on the norm of the residual and on the monotony of the total energy variation. This stopping criterion, based on both the norm of the residual and on the monotony of the energy variation, is effective; however, it may be useful to provide less stringent stopping criterion; this is especially useful where the flexible system passes through an unstable state, before finding an equilibrium.

The invention suggests using, as a stopping criterion, a residual energy norm defined as the scalar product between the residual and the displacement variation. Using such a stopping criterion allows the system to pass more easily through unstable states. This is particularly visible when the system undergoes a bifurcation and passes brutally from one given configuration to a very different configuration. Using the proposed stopping criterion makes it easier to find a solution during the iterative minimizing of energy carried out in each incremental step; accordingly, computations are shorter. The use of this stopping criterion is independent of the co-rotational update disclosed above.

In the description of the process up to now, the predetermined reference displacement of the flexible system at both ends therefore is fully determined—in other words, position and orientation of the flexible system are fully constrained. In the embodiment now disclosed, one considers the case where the flexible system has some degrees of freedom, even at its ends. One example, for flexible systems, is where one point of the flexible system—often one end thereof—is fixed in position, but free in rotation; this means that the point is fixed in translation, but has three degrees of freedom in rotation. Another example is a sliding point for the flexible system: the system is free to slide along one direction, and possibly to rotate around the sliding direction; in this example, the flexible system has one degree of freedom in translation and one degree of freedom in rotation.

Solutions exist in the prior art, for linear systems. Such solutions are disclosed in *Analyse des structures par éléments finis*, J.F. Imbert, CEPADUES Editions, 1979-1984, page 276 or in MSC NASTRAN Version 64, *Handbook for linear Analysis*, 1985, The MacNeal-Schwendel Corp., page 4.4.1, Chapter 4.4, *Multipoint Constraint Operations*. These documents suggest factorizing the constraints, that is expressing some of the constraints or degrees of freedom as a function of the other degrees of freedom. Specifically, let X be the column vector of degrees of freedom in a given linear system. The generic problem to be solved may be written as $$K.X+A^T.\lambda=F_{app} \text{ and } A.X=b \quad (1)$$

where K is the stiffness matrix, A is the jacobian matrix of the displacement constraints, λ is the column vector of Lagrange multipliers, b is the column vector of constraint right-hand sides, and $F_{app}$ is the column vector of forces applied to the system ($A^T$ denotes the transpose of matrix A). The prior art solution consists in factorizing the constraints, that is finding an independent subset $X_a$ of degrees of freedom, along with matrices N and M such that $$X=N.X_a+M \quad (2)$$

This makes it possible to replace the value of X in eq. (1). Assuming A.N=0, eq. (1) when pre-multiplied by $N^T$ provides $$N^T.K.N.X_a=N^T.(F_{app}-K.M)$$

which may be solved in the independent degrees $X_a$ of freedom using prior art solution. Once $X_a$, (which includes the set of relaxed degrees of freedom), is found, the full displacement may be recovered thanks to eq. (2).

Besides the fact that the automatic partition of the set of degrees of freedom into independent and dependent subsets is an expensive process even in the case of linear problems, this solution causes some additional problems in the case of non-linear problems. First, in a non-linear system, the frames of reference need to be updated, as explained above. This means that the constraints will have to be factorized again each time the frames of reference are updated; in other words, the value of matrix N in eq. (2) needs to be computed again after each incremental step. Second, in a computer system, where numbers are stored on a limited number of digits, inverting a matrix, as required for factorizing the constraints, may lower the robustness of the computations. Last, the stiffness matrix K would vary in each incremental step, which requires repeatedly computing $N^T.K.N$; this proves to be costly.

Thus, there is a requirement for allowing constraints to be relaxed in a non-linear system, involving update of reference frames. The invention, in one embodiment, suggests using hybrid reference frames for minimizing energy, with local reference frames for those nodes of the system with constraints consisting of partly relaxed and partly imposed degrees of freedom.

Local reference frames are selected so that the released degrees of freedom are expressed along the axes of the local reference frame. Finding the subset of unconstrained degrees of freedom $X_a$ may then be simply carried out by selecting in equation (1) the lines that correspond to relaxed (non-imposed) degrees of freedom (in other words, by eliminating from the stiffness matrix the lines and columns corresponding to imposed,—i.e.: non-relaxed-degrees of freedom).

This provides a solution to the problems discussed above. The solution of the invention only requires the carrying out of specifically selected changes of reference frames at each incremental step; however, a change of reference frame is anyhow necessary at each step for minimizing the energy; as discussed below, the change to a set of hybrid reference frames is not more complex from the computation standpoint.

Figure 6:
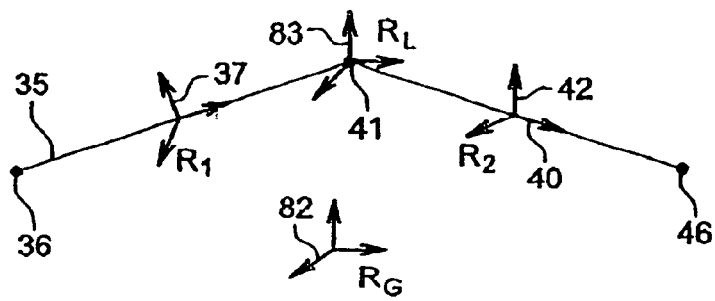
FIG. 6 is a view of two finite elements with the frames used in case where a node of the system has a degree of freedom.

The solution is exemplified in reference to FIG. 6, which shows two finite elements 35 and 40, with their respective nodes 36, 41 and 41, 46. FIG. 6 further shows elementary reference frames 37 and 42 for the first and second finite elements 35 and 40; frames 37 and 42 are respectively noted $R_1$ and $R_2$, for the sake of simplicity. Let $X_1$ be the column vector of degrees of freedom at point 36, while $X_2$ respectively $X_3$ are the column vectors of degrees of freedom at points 41 and 46.

In the absence of relaxed degrees of freedom, the stiffness matrix would first be computed for each finite element 35 and 40, in the elementary reference frame or in any frame relative to the finite element. Once the stiffness matrix is computed for each element in the corresponding elementary frame, the various matrices are expressed in a global frame of reference, and may then be summed, as explained in Eq. (3) to (6) below.

Specifically, the equilibrium equation K.X=F is written, for the first element 35 in the local frame $R_1$ $$\begin{bmatrix} K_{11} & K_{12} \\ K_{21} & K_{22} \end{bmatrix} \begin{bmatrix} X_1 \\ X_2 \end{bmatrix}_1 = \begin{bmatrix} F_1 \\ F_2 \end{bmatrix} \quad (3)$$

Similarly, for the second finite element, in the corresponding local frame $R_2$ for the second element, one obtains $$\begin{bmatrix} K_{22} & K_{23} \\ K_{32} & K_{33} \end{bmatrix} \begin{bmatrix} X_2 \\ X_3 \end{bmatrix}_2 = \begin{bmatrix} F_2 \\ F_3 \end{bmatrix} \quad (4)$$

where each $K_{ij}$ is actually a 6×6 matrix if each $X_k$ has six degrees of freedom. In eq. (3) and (4), the subscripts 1 and 2 to the matrices are representative of the fact that the matrices are expressed in the local frames of reference $R_1$ and $R_2$.

If no constraints are relaxed, one would simply apply a change of reference frame to eq. (3) and eq. (4), so that they all read in a global reference frame $R_G$, referenced 82 in FIG. 6. Assuming the matrix for passing from local reference frame $R_1$ into global reference frame $R_G$ is noted $P_1$, one has $$\begin{bmatrix} X_1 \\ X_2 \end{bmatrix}_1 = \begin{bmatrix} P_1 & \\ & P_1 \end{bmatrix} \begin{bmatrix} X_1 \\ X_2 \end{bmatrix}_G$$

where the subscript G indicates that the degrees of freedom are expressed in the global reference frame $R_G$. Equation (3) thus changes into $$\begin{bmatrix} P_1 & \\ & P_1 \end{bmatrix}^T \begin{bmatrix} K_{11} & K_{12} \\ K_{21} & K_{22} \end{bmatrix} \begin{bmatrix} P_1 & \\ & P_1 \end{bmatrix} \begin{bmatrix} X_1 \\ X_2 \end{bmatrix}_G = \begin{bmatrix} P_1 & \\ & P_1 \end{bmatrix}^T \begin{bmatrix} F_1 \\ F_2 \end{bmatrix}_1$$

where $P_1$ is the change of reference frame matrix for passing from local reference frame $R_1$ into global reference frame RG. Eq. (3) thus reads in frame $R_G$ $$\begin{bmatrix} P_1^T K_{11} P_1 & P_1^T K_{12} P_1 \\ P_1^T K_{21} P_1 & P_1^T K_{22} P_1 \end{bmatrix} \begin{bmatrix} X_1 \\ X_2 \end{bmatrix}_G = \begin{bmatrix} P_1^T F_1 \\ P_1^T F_2 \end{bmatrix} \quad (5)$$

while Eq. (4) reads in frame $R_G$ $$\begin{bmatrix} P_2^T K_{22} P_2 & P_2^T K_{32} P_2 \\ P_2^T K_{32} P_2 & P_2^T K_{33} P_2 \end{bmatrix} \begin{bmatrix} X_2 \\ X_3 \end{bmatrix}_G = \begin{bmatrix} P_2^T F_2 \\ P_2^T F_3 \end{bmatrix} \quad (6)$$

$P_2$ being the change of reference frame matrix for passing from local reference frame $R_2$ into global reference frame $R_G$. One obtains the global equilibrium equation by summing equations (5) and (6) for all finite elements. This provides, in the example of FIG. 6 with only two finite elements $$\begin{bmatrix} P_1^T K_{11} P_1 & P_1^T K_{12} P_1 & \\ P_1^T K_{21} P_1 & P_1^T K_{22} P_1 + P_2^T K_{22} P_2 & P_2^T K_{32} P_2 \\ & P_2^T K_{32} P_2 & P_2^T K_{33} P_2 \end{bmatrix} \begin{bmatrix} X_1 \\ X_2 \\ X_3 \end{bmatrix}_G = \quad (6)$$

$$\begin{bmatrix} P_1^T F_1 \\ P_1^T F_2 + P_2^T F_2 \\ P_2^T F_3 \end{bmatrix}$$

There is some ambiguity in these formula—for instance, $F_2$ denotes the force applied to the second node 41 expressed in $R_1$ and at the same time the force applied to the second node 41 expressed in $R_2$. The ambiguity is raised thanks to the use of matrices $P_1$ and $P_2$; thus, for the sake of simplicity, one does not use additional subscripts for avoiding the ambiguity. Equation (6) shows the form of the stiffness matrix, as computed in a global reference frame. The example of FIG. 6 generalizes to more than two finite elements—with a summation of the stiffness matrices computed in each local frame of reference. Due to the necessary co-rotational update of the frames of reference, the computation of the changes of frames $P_1$ for each element of the flexible system is carried out at each incremental step.

The invention, in this embodiment, suggests using a hybrid frame of reference for minimizing energy; for nodes with some imposed and some released degrees of freedom, one uses a local frame instead of using a global frame. The local frame is selected so that the degrees of freedom are expressed along the axes of the local frame.

Assume for instance that at least a degree of freedom is released in node 41 which is otherwise fixed. Let $R_L$ be a frame of reference where the released degree of freedom is expressed along one axis; this frame is referenced 83 in FIG. 6. For instance, if the relaxed constraint or degree of freedom is a tangential one, whereby the system is free to slide in one direction, one could use the tangential nodal frame as local frame of reference $R_L$. The same nodal frame could be used if the system were free to slide along one direction and rotation around the same direction. In such a case, for matrix $X_1$, one would use the change of frame $P_1$ to the same global reference frame $R_G$; similarly, for matrix $X_3$, one would use the change of frame $P_2$ to the same global reference frame $R_G$. However, for matrix $X_2$, the frame is changed to the local frame $R_L$. Eq. (3) above changes into $$\begin{bmatrix} P_1 & \\ & P_{1L} \end{bmatrix}^T \begin{bmatrix} K_{11} & K_{12} \\ K_{21} & K_{22} \end{bmatrix} \begin{bmatrix} P_1 & \\ & P_{1L} \end{bmatrix} \begin{bmatrix} X_{1G} \\ X_{2L} \end{bmatrix} = \begin{bmatrix} P_1 & \\ & P_{1L} \end{bmatrix}^T \begin{bmatrix} F_1 \\ F_2 \end{bmatrix}_1$$

where the last subscript, where applicable, denotes the reference frame used for expressing $X_1$ and $X_2$ and where $P_{1L}$ denotes the matrix for changing frames of reference, from local frame of reference $R_1$ to local frame of reference $R_L$ and $P_{2L}$ denotes the matrix for changing frames of reference, from local frame of reference $R_2$ to local frame of reference $R_L$.

One understands that $P_{1L}$ could simply be the identity matrix, if the local frame $R_L$ was the local frame $R_1$. This may be the case if frame $R_1$ is adapted for expressing the degree(s) of freedom along one axis.

Thus, in the hybrid frame of reference, Eq. (3) and (4) read respectively and $$\begin{bmatrix} P_1^T K_{11} P_1 & P_1^T K_{12} P_{1L} \\ P_{1L}^T K_{21} P_1 & P_{1L}^T K_{22} P_{1L} \end{bmatrix} \begin{bmatrix} X_{1G} \\ X_{2L} \end{bmatrix} = \begin{bmatrix} P_1^T F_1 \\ P_{1L}^T F_2 \end{bmatrix} \text{ and} \qquad (7)$$

$$\begin{bmatrix} P_{2L}^T K_{22} P_2 & P_{2L}^T K_{32} P_2 \\ P_2^T K_{32} P_{2L} & P_2^T K_{33} P_2 \end{bmatrix} \begin{bmatrix} X_{2l} \\ X_{3G} \end{bmatrix} = \begin{bmatrix} P_{2L}^T F_2 \\ P_2^T F_3 \end{bmatrix} \qquad (8)$$

This leads to the following stiffness matrix for the two finite elements $$\begin{bmatrix} P_1^T K_{11} P_1 & P_1^T K_{12} P_{1L} & \\ P_{1L}^T K_{21} P_1 & P_{1L}^T K_{22} P_{1L} + P_{2L}^T K_{22} P_{2L} & P_{2L}^T K_{32} P_2 \\ & P_2^T K_{32} P_{2L} & P_2^T K_{33} P_2 \end{bmatrix} \begin{bmatrix} X_{1G} \\ X_{2L} \\ X_{3G} \end{bmatrix} = \qquad (8)$$

$$\begin{bmatrix} P_1^T F_1 \\ P_{1L}^T F_2 + P_{2L}^T F_2 \\ P_2^T F_3 \end{bmatrix}$$

Eq. (8) demonstrates that the stiffness matrix and the forces applied to the system may be expressed in a hybrid frame of reference, with a computation which is substantially the same as the one used in the case where constraints are not relaxed. The only difference is that one has to find a local reference frame RL and to compute two additional matrices P1L and P2L for passing from the local reference frames R1 and R2 into the new local reference frame at partly constrained node(s) where a constraint is relaxed.

However, once Eq. (8) is computed, minimizing energy does not require anything like the computation of matrices N and M of Eq. (2) given above. Indeed, the local reference frame $R_L$ is selected so that the relaxed degree of freedom is expressed along one axis of the reference frame. This means that the selection of the subset $X_a$ may be carried out simply by selecting all constraints that are relaxed. In other words, one simply deletes in Eq. (8) the lines and columns of the stiffness matrix and the lines of the load vector corresponding to the axis or axes of the local frame of reference on which the constraint is not relaxed.

Specifically, in the example of FIG. 6, one considers for each node six degrees of freedom, three in translation (u, v, w) and three in rotation ($\theta_x$, $\theta_y$, $\theta_z$). Each of the $X_1$ is written as $$X_i = \begin{bmatrix} u_i \\ v_i \\ w_i \\ \theta_{xi} \\ \theta_{yi} \\ \theta_{zi} \end{bmatrix}$$

The stiffness matrix in Eq. (8), expressed in the hybrid frame of reference, is thus 24×24 matrix. Assume that there is one degree of freedom at node 41, the node being free to rotate around axis u—that is, $\theta_{x2}$ is relaxed. This means that $u_2$, $v_2$, $w_2$, $\theta_{y2}$ and $\theta_{z2}$ are fixed, while $\theta_{x2}$ and all variables in $X_1$ and $X_3$ need to be computed. To this effect one proceeds as disclosed above in reference to FIGS. 2 and 3 for the computation of displacement in the nodes apart from the end nodes.

More specifically: equation 8 is first detailed as:

$$\begin{bmatrix}
k_{11} & k_{12} & k_{13} & k_{14} & k_{15} & k_{16} & k_{17} & k_{18} & k_{19} & k_{110} & k_{111} & k_{112} & & & & & & \\
k_{21} & k_{22} & k_{23} & k_{24} & k_{25} & k_{26} & k_{27} & k_{28} & k_{29} & k_{210} & k_{211} & k_{212} & & & & & & \\
k_{31} & k_{32} & k_{33} & k_{34} & k_{35} & k_{36} & k_{37} & k_{38} & k_{39} & k_{310} & k_{311} & k_{312} & & & & & & \\
k_{41} & k_{42} & k_{43} & k_{44} & k_{45} & k_{46} & k_{47} & k_{48} & k_{49} & k_{410} & k_{411} & k_{412} & & & & & & \\
k_{51} & k_{52} & k_{53} & k_{54} & k_{55} & k_{56} & k_{57} & k_{58} & k_{59} & k_{510} & k_{511} & k_{512} & & & & & & \\
k_{61} & k_{62} & k_{63} & k_{64} & k_{65} & k_{66} & k_{67} & k_{68} & k_{69} & k_{610} & k_{611} & k_{612} & & & & & & \\
k_{71} & k_{72} & k_{73} & k_{74} & k_{75} & k_{76} & k_{77} & k_{78} & k_{79} & k_{710} & k_{711} & k_{712} & k_{713} & k_{714} & k_{715} & k_{716} & k_{717} & k_{718} \\
k_{81} & k_{82} & k_{83} & k_{84} & k_{85} & k_{86} & k_{87} & k_{88} & k_{89} & k_{810} & k_{811} & k_{812} & k_{813} & k_{814} & k_{815} & k_{816} & k_{817} & k_{818} \\
k_{91} & k_{92} & k_{93} & k_{94} & k_{95} & k_{96} & k_{97} & k_{98} & k_{99} & k_{910} & k_{911} & k_{912} & k_{913} & k_{914} & k_{915} & k_{916} & k_{917} & k_{918} \\
k_{101} & k_{102} & k_{103} & k_{104} & k_{105} & k_{106} & k_{107} & k_{108} & k_{109} & k_{1010} & k_{1011} & k_{1012} & k_{1013} & k_{1014} & k_{1015} & k_{1016} & k_{1017} & k_{1018} \\
k_{111} & k_{112} & k_{113} & k_{114} & k_{115} & k_{116} & k_{117} & k_{118} & k_{119} & k_{1110} & k_{1111} & k_{1112} & k_{1113} & k_{1114} & k_{1115} & k_{1116} & k_{1117} & k_{1118} \\
k_{121} & k_{122} & k_{123} & k_{124} & k_{125} & k_{126} & k_{127} & k_{128} & k_{129} & k_{1210} & k_{1211} & k_{1212} & k_{1213} & k_{1214} & k_{1215} & k_{1216} & k_{1217} & k_{1218} \\
 & & & & & & k_{137} & k_{138} & k_{139} & k_{1310} & k_{1311} & k_{1312} & k_{1313} & k_{1314} & k_{1315} & k_{1316} & k_{1317} & k_{1318} \\
 & & & & & & k_{147} & k_{148} & k_{149} & k_{1410} & k_{1411} & k_{1412} & k_{1413} & k_{1414} & k_{1415} & k_{1416} & k_{1417} & k_{1418} \\
 & & & & & & k_{157} & k_{158} & k_{159} & k_{1510} & k_{1511} & k_{1512} & k_{1513} & k_{1514} & k_{1515} & k_{1516} & k_{1517} & k_{1518} \\
 & & & & & & k_{167} & k_{168} & k_{169} & k_{1610} & k_{1611} & k_{1612} & k_{1613} & k_{1614} & k_{1615} & k_{1616} & k_{1617} & k_{1618} \\
 & & & & & & k_{177} & k_{178} & k_{179} & k_{1710} & k_{1711} & k_{1712} & k_{1713} & k_{1714} & k_{1715} & k_{1716} & k_{1717} & k_{1718} \\
 & & & & & & k_{187} & k_{188} & k_{189} & k_{1810} & k_{1811} & k_{1812} & k_{1813} & k_{1814} & k_{1815} & k_{1816} & k_{1817} & k_{1818}
\end{bmatrix} \begin{bmatrix} u_{1G} \\ v_{1G} \\ w_{1G} \\ \theta_{xIG} \\ \theta_{yIG} \\ \theta_{zIG} \\ u_{2L} \\ v_{2L} \\ w_{2L} \\ \theta_{x2L} \\ \theta_{y2L} \\ \theta_{z2L} \\ u_{3G} \\ v_{3G} \\ w_{3G} \\ \theta_{x3G} \\ \theta_{y3G} \\ \theta_{z3G} \end{bmatrix} = \begin{bmatrix} F_{x1G}^{app} \\ F_{y1G}^{app} \\ F_{z1G}^{app} \\ M_{x1G}^{app} \\ M_{y1G}^{app} \\ M_{z1G}^{app} \\ F_{x2L}^{app} \\ F_{y2L}^{app} \\ F_{z2L}^{app} \\ M_{x2L}^{app} \\ M_{y2L}^{app} \\ M_{z2L}^{app} \\ F_{x3G}^{app} \\ F_{y3G}^{app} \\ F_{z3G}^{app} \\ M_{x3G}^{app} \\ M_{y3G}^{app} \\ M_{z3G}^{app} \end{bmatrix}$$

In this equation, $k_{ij}$, with $1 \leq i \leq 18$ and $1 \leq j \leq 18$ are the various coefficients of the stiffness matrix, computed as discussed above. The first subscript to u, v, w, $\theta_x$, $\theta_y$ and $\theta_z$ is representative of the node; the second subscript to u, v, w, $\theta_x$, $\theta_y$ and $\theta_z$ is representative of the frame in which the displacement is expressed, G standing for the global frame of reference $R_G$ and L standing for the local frame of reference $R_L$.

As regards the applied load, $F_x^{app}$, $F_y^{app}$ and $F_z^{app}$ are representing the components of the force applied to the node, while $M_x^{app}$, $M_y^{app}$ and $M_z^{app}$ are representing the components of the torque applied to the node; The first subscript (Arabic subscript) is representative of the node to which the load is applied; the second subscript is representative of the frame in which the displacement is expressed, G standing for the global frame of reference $R_G$ and L standing for the local frame of reference $R_L$.

When considered in conjunction with the five constraint conditions:

$$\begin{cases} u_{2L} = \bar{u}_{2L} \\ v_{2L} = \bar{v}_{2L} \\ w_{2l} = \bar{w}_{2L} \\ \theta_{y2L} = \bar{\theta}_{y2L} \\ \theta_{z2L} = \bar{\theta}_{z2L} \end{cases}$$

expressed in the local coordinate system $R_L$, the equation becomes:

$$\begin{bmatrix} u_{1G} \\ v_{1G} \\ w_{1G} \\ \theta_{x1G} \\ \theta_{y1G} \\ \theta_{z1G} \\ u_{2L} \\ v_{2L} \\ w_{2L} \\ \theta_{x2L} \\ \theta_{y2L} \\ \theta_{z2L} \\ u_{3G} \\ v_{3G} \\ w_{3G} \\ \theta_{x3G} \\ \theta_{y3G} \\ \theta_{z3G} \end{bmatrix} = \begin{bmatrix} u_{1G} \\ v_{1G} \\ w_{1G} \\ \theta_{x1G} \\ \theta_{y1G} \\ \theta_{z1G} \\ 0 \\ 0 \\ 0 \\ \theta_{x2L} \\ 0 \\ 0 \\ u_{3G} \\ v_{3G} \\ w_{3G} \\ \theta_{x3G} \\ \theta_{y3G} \\ \theta_{z3G} \end{bmatrix} + \begin{bmatrix} 0 \\ 0 \\ 0 \\ 0 \\ 0 \\ 0 \\ \bar{u}_{2L} \\ \bar{v}_{2K} \\ \bar{w}_{2L} \\ 0 \\ \bar{\theta}_{y2L} \\ \bar{\theta}_{z2L} \\ 0 \\ 0 \\ 0 \\ 0 \\ 0 \\ 0 \end{bmatrix}$$

Notice that in this restitution formula the displacement vector components are expressed partly in the local reference frame, that is, at the middle node, and partly in the global reference frame, that is, at the other two nodes; it is of course now possible to entirely express the displacement vector in the global reference frame.

Once all components of the $X_a$ vector are computed, co-rotational update as well as update of the nodal frames of reference may be carried out as discussed above. The only $$\begin{bmatrix} k_{11} & k_{12} & k_{13} & k_{14} & k_{15} & k_{16} & k_{110} & & & & & & \\ k_{21} & k_{22} & k_{23} & k_{24} & k_{25} & k_{26} & k_{210} & & & & & & \\ k_{31} & k_{32} & k_{33} & k_{34} & k_{35} & k_{36} & k_{310} & & & & & & \\ k_{41} & k_{42} & k_{43} & k_{44} & k_{45} & k_{46} & k_{410} & & & & & & \\ k_{51} & k_{52} & k_{53} & k_{54} & k_{55} & k_{56} & k_{510} & & & & & & \\ k_{61} & k_{62} & k_{63} & k_{64} & k_{65} & k_{66} & k_{610} & & & & & & \\ k_{101} & k_{102} & k_{103} & k_{104} & k_{105} & k_{106} & k_{1010} & k_{1013} & k_{1014} & k_{1015} & k_{1016} & k_{1017} & k_{1018} \\ & & & & & & k_{1310} & k_{1313} & k_{1314} & k_{1315} & k_{1316} & k_{1317} & k_{1318} \\ & & & & & & k_{1410} & k_{1413} & k_{1414} & k_{1415} & k_{1416} & k_{1417} & k_{1418} \\ & & & & & & k_{1510} & k_{1513} & k_{1514} & k_{1515} & k_{1516} & k_{1517} & k_{1518} \\ & & & & & & k_{1610} & k_{1613} & k_{1614} & k_{1615} & k_{1616} & k_{1617} & k_{1618} \\ & & & & & & k_{1710} & k_{1713} & k_{1714} & k_{1715} & k_{1716} & k_{1717} & k_{1718} \\ & & & & & & k_{1810} & k_{1813} & k_{1814} & k_{1815} & k_{1816} & k_{1817} & k_{1818} \end{bmatrix} \begin{bmatrix} u_{1G} \\ v_{1G} \\ w_{1G} \\ \theta_{x1G} \\ \theta_{y1G} \\ \theta_{z1G} \\ \theta_{x2L} \\ u_{3G} \\ v_{3G} \\ w_{3G} \\ \theta_{x3G} \\ \theta_{y3G} \\ \theta_{z3G} \end{bmatrix} = \begin{bmatrix} F_{x1G}^{TOT} \\ F_{y1G}^{TOT} \\ F_{z1G}^{TOT} \\ M_{x1G}^{TOT} \\ M_{y1G}^{TOT} \\ M_{z1G}^{TOT} \\ M_{x2L}^{TOT} \\ F_{x3G}^{TOT} \\ F_{y3G}^{TOT} \\ F_{z3G}^{TOT} \\ M_{x3G}^{TOT} \\ M_{y3G}^{TOT} \\ M_{z3G}^{TOT} \end{bmatrix}$$

Once energy is minimized (thus obtaining the $X_a$ set of degrees of freedom, which includes the relaxed rotation about the local u axis at the middle node, that is, the local degree of freedom $\theta_{x2}$, along with all the global degrees of freedom of the other two nodes), the full vector of degrees of freedom X may be recovered as follows:

difference is that the update uses, for nodes having a degree of freedom, a combination of the computed components and of the constrained components. In the example of FIG. 6, $u_2$, $v_2$, $w_2$, $\theta_{y2}$ and $\theta_{z2}$ are fixed, while $\theta_{x2}$ is computed at the same time as the components of $X_1$ and $X_2$. For the update of the reference frame and of the nodal frame, one may proceed as disclosed above, using displacement components ($u_2$, $v_2$, $w_2$, $\theta_{x2}$, $\theta_{y2}$, $\theta_{z2}$), without taking into account the fact that these components result from a fraction of the predetermined displacement boundary conditions;

the minimizing of energy during the incremental step.

This embodiment of the invention makes it possible to relax some constraints at nodes of the finite element representation of the system. It uses the fact that a change of reference frames is implemented after each incremental step, due to the co-rotational update; a careful selection of the frames in which the energy is minimized makes it possible to avoid any factorization of constraints.

Examples of the process are given below, in reference to FIG. 7 to 22. These four examples use a non-linear solver core (FORTRAN code) integrated in CATIA V5, of Dassault Systemes, Suresnes France. For each example the simulation consists of 75 incremental steps (45 steps from start to initial configuration, 30 steps from initial to final configuration). Only a few of these steps are displayed in the figures. All runs were performed on an IBM Thinkpad T42 (1.8 GHz Pentium IV processor, 1.0 GB of RAM).

The first example is represented in FIGS. 7 to 10. The system is a single segment; both end points are fully imposed. The system is analyzed as a 12 elements model. Full run in carried out in 0.28 sec CPU time; in each incremental step of the initial-to-final phase, convergence is attainted in 6 iterations on the average.

Figure 7:
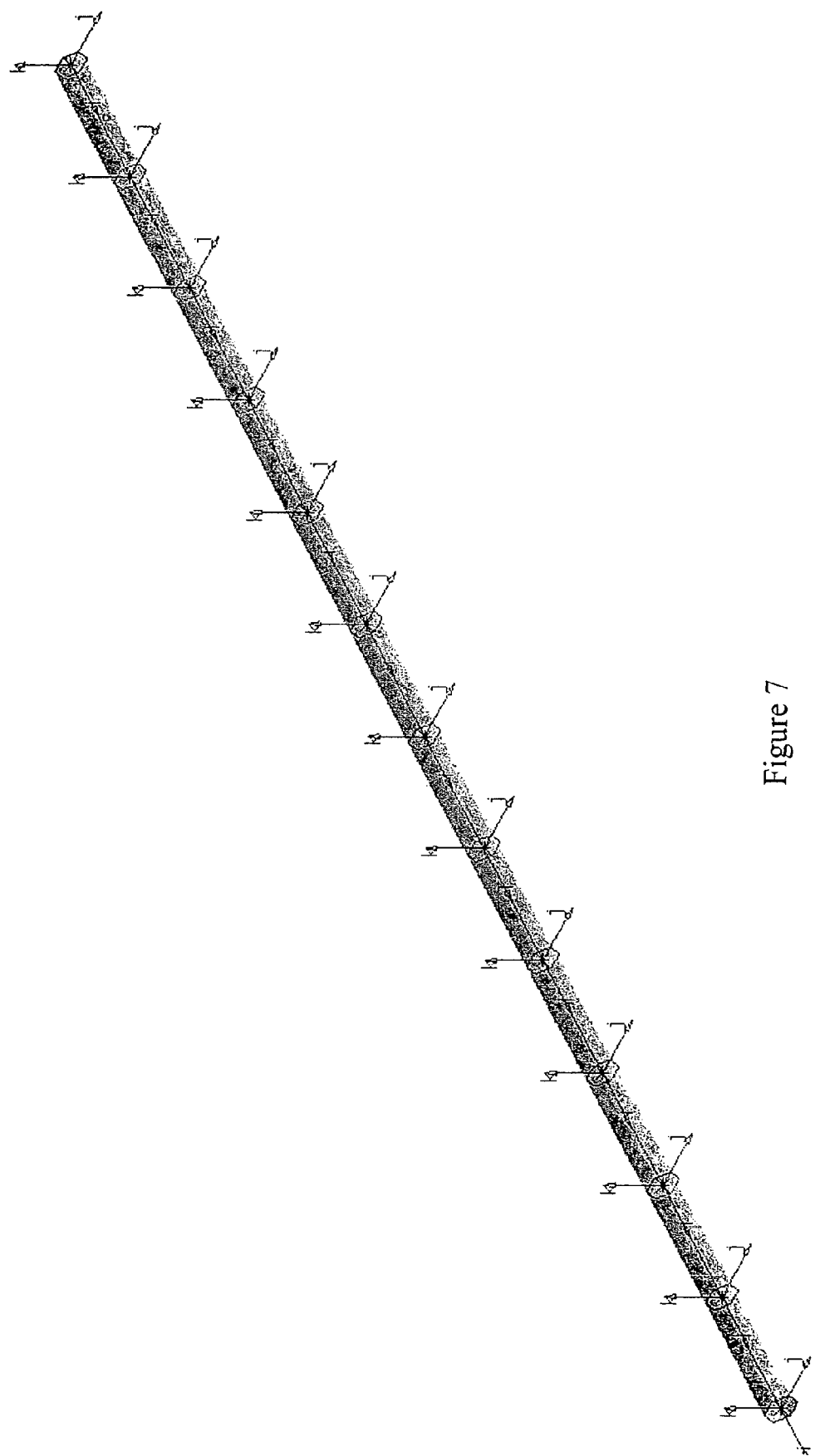
FIGS. 7 to 22 show various examples of the process.

Node positions and nodal reference frames are represented in all figures. FIG. 7 shows the start configuration, in which the shape of the system is fully specified by the user.

Figure 8:

FIG. 8 shows the initial configuration; end point positions and orientations are specified by the user, and represented in the figure as light reference frames. Deformed shape of the system is computed by the program.

Figure 9:
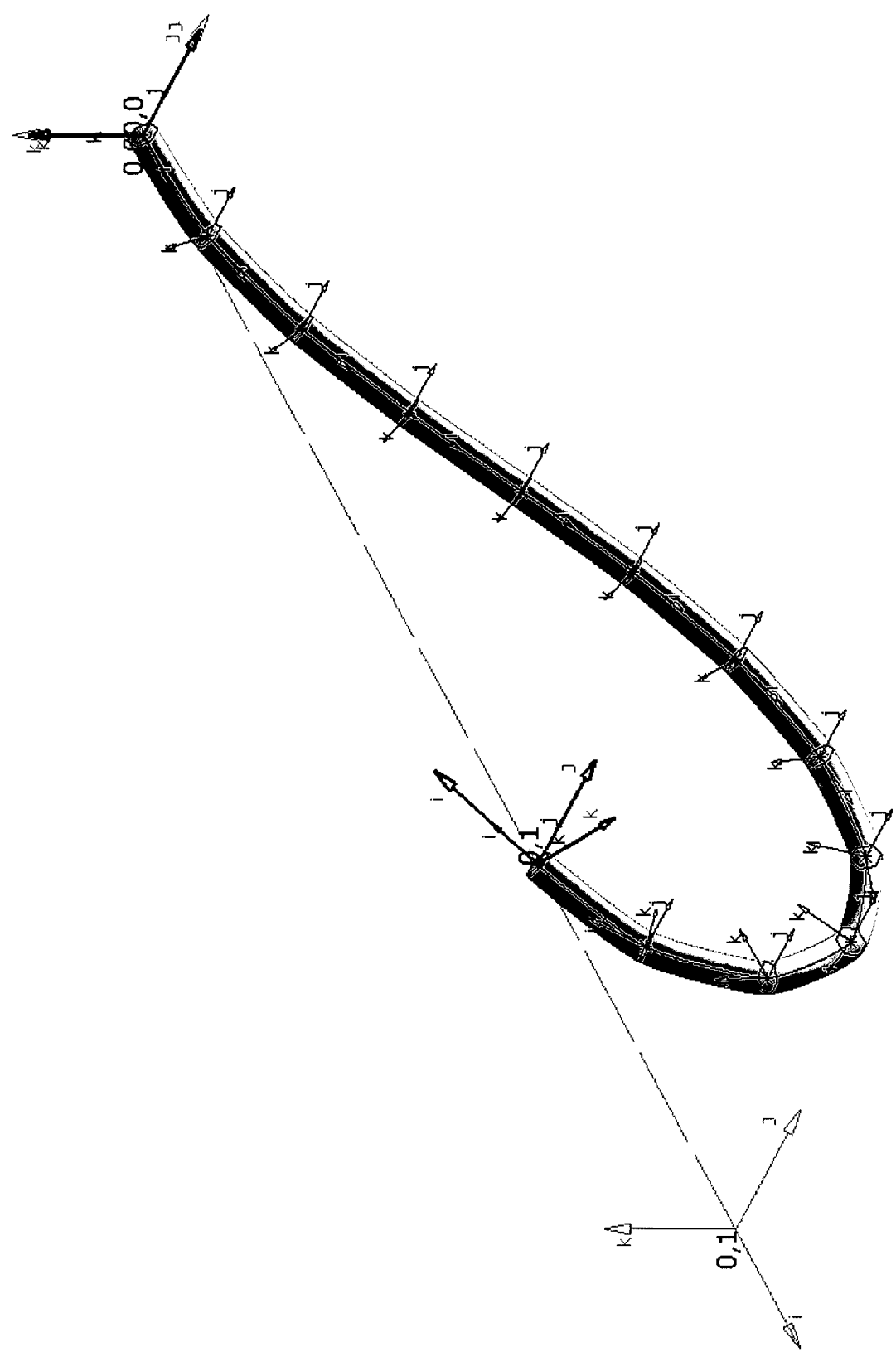

FIG. 9 shows the final configuration; end point positions and orientations are specified by the user and are represented as thick reference frames. Deformed shape is computed by the program. The difference between the end points positions and orientations in FIGS. 8 and 9 represents the predetermined displacement boundary conditions to which the system is submitted.

Figure 10:
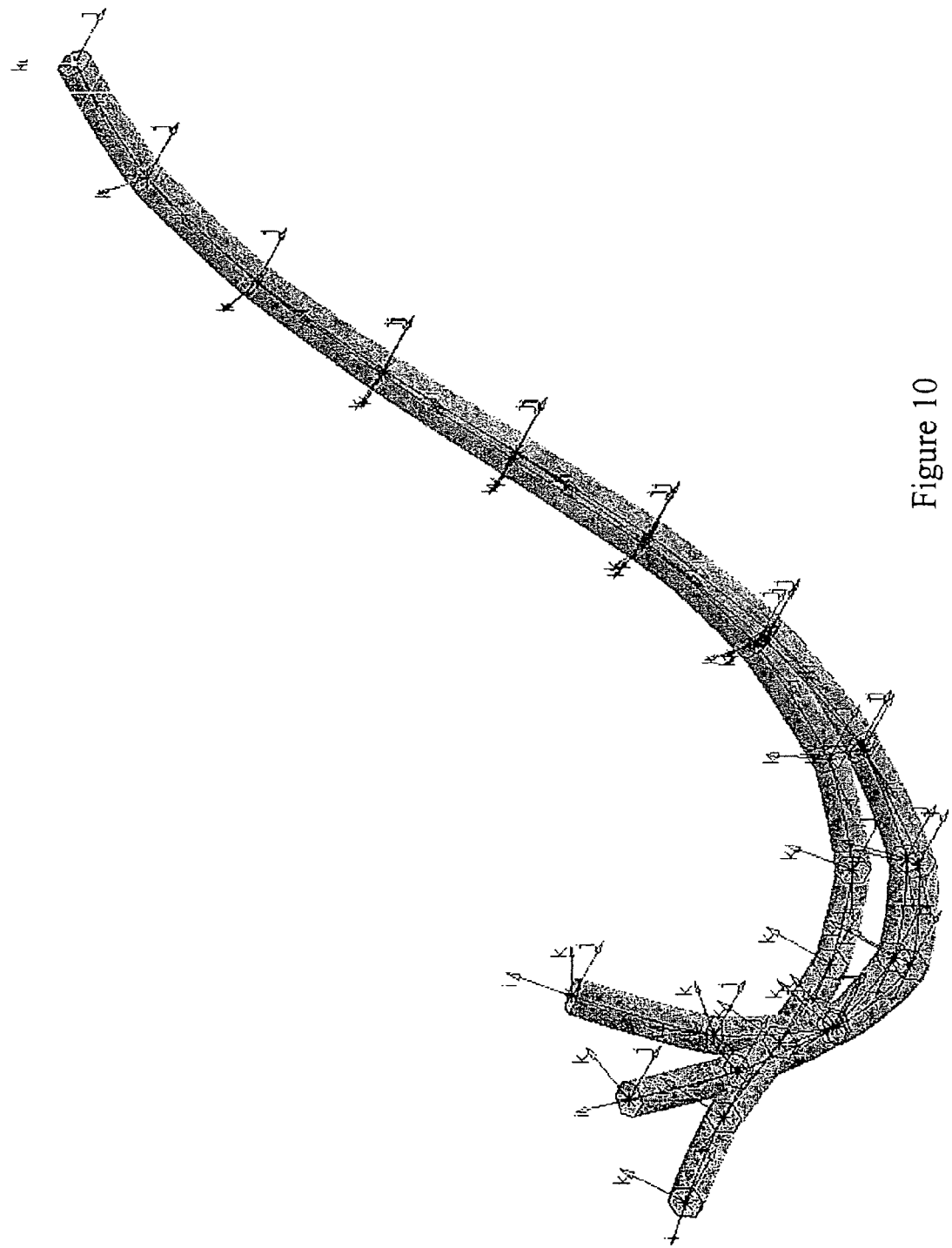
Figure 11:
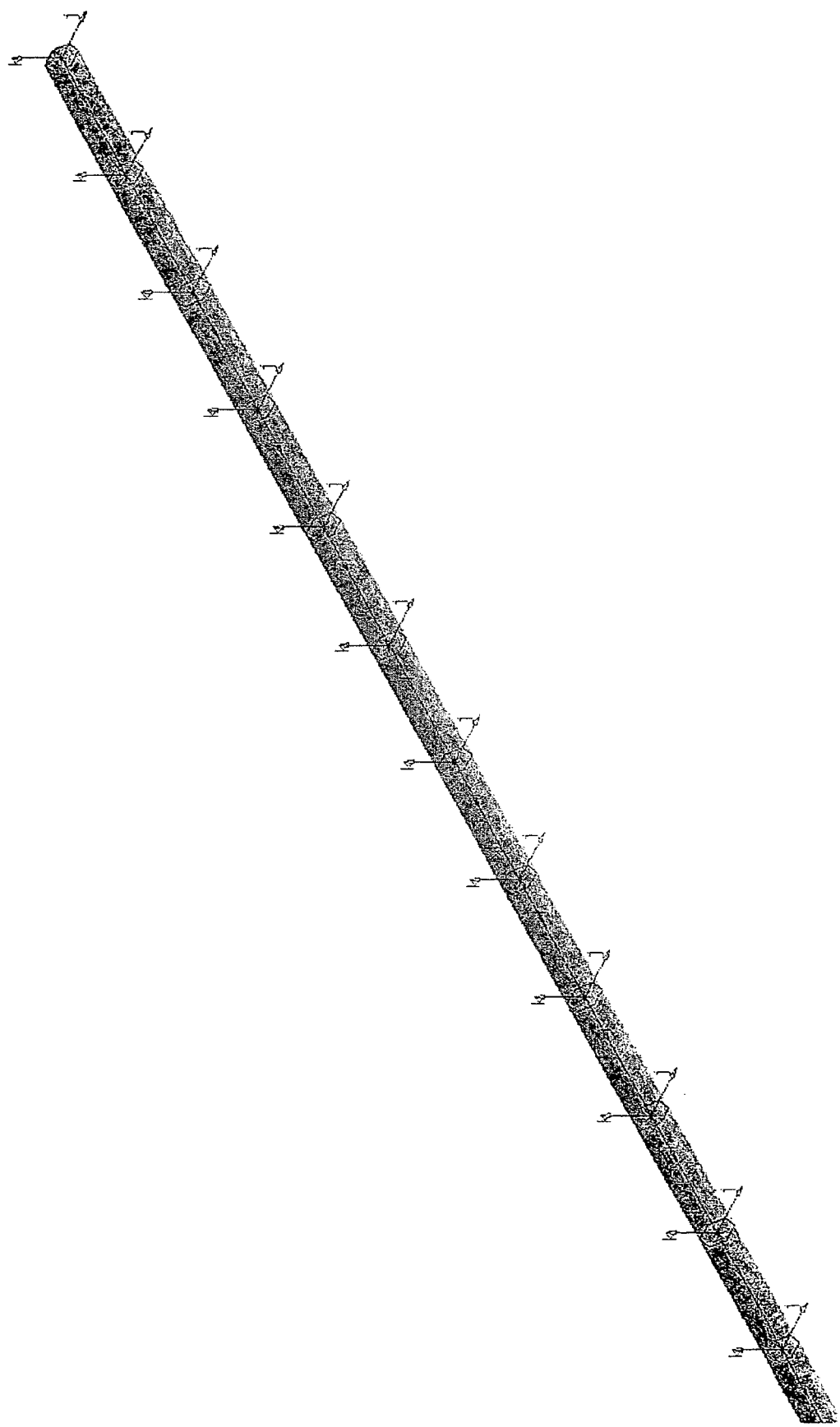
Figure 12:
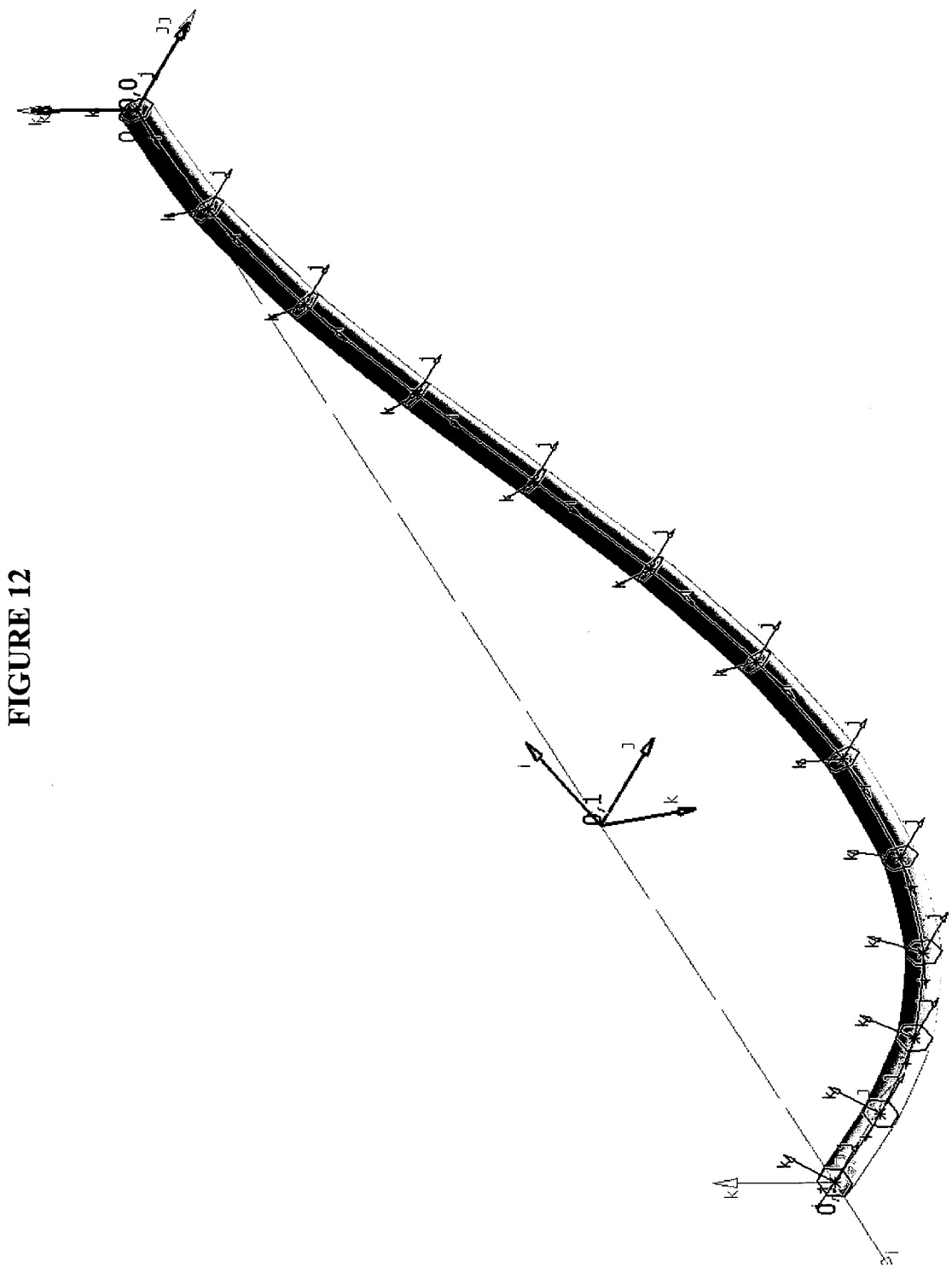
Figure 13:
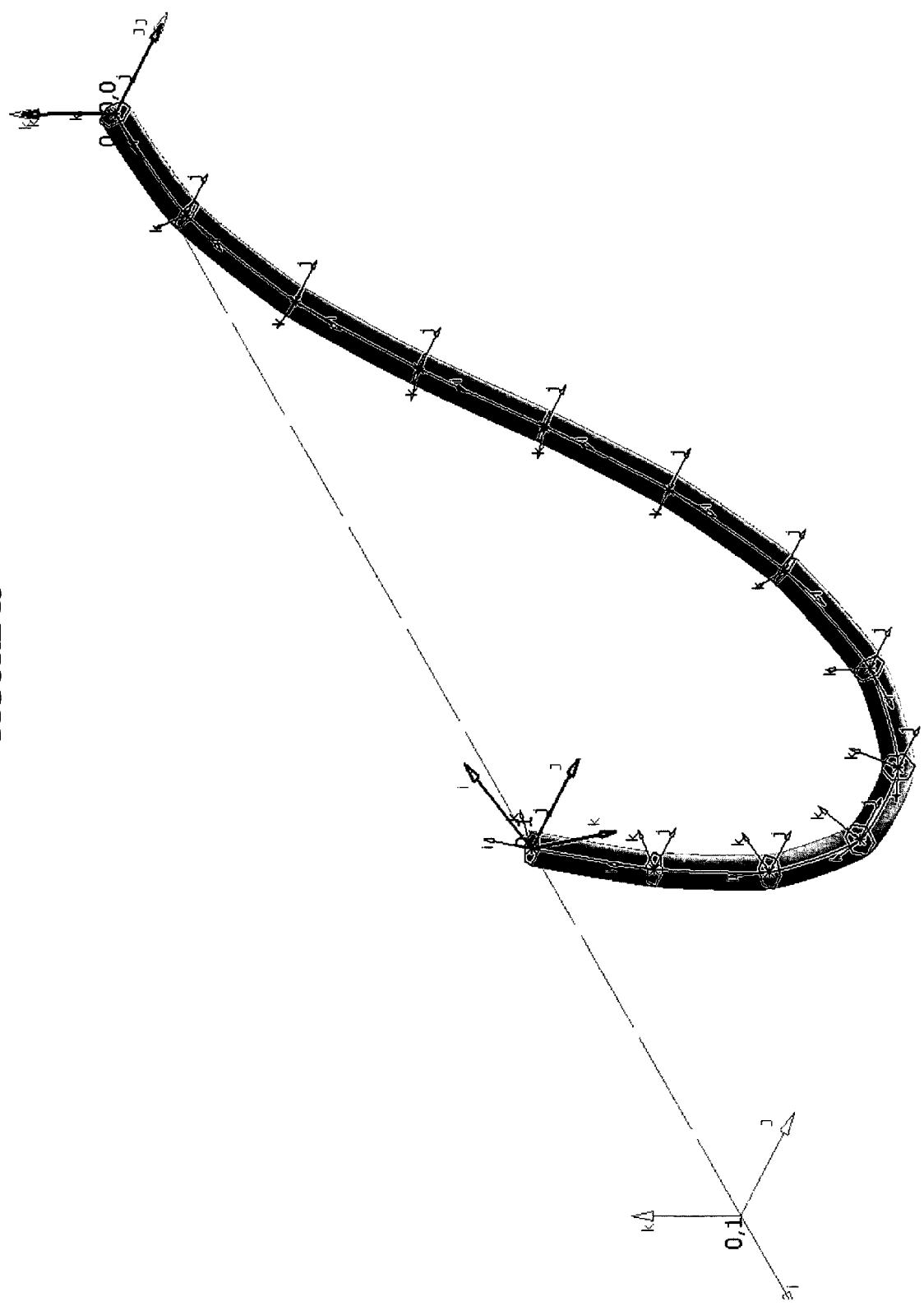
Figure 14:
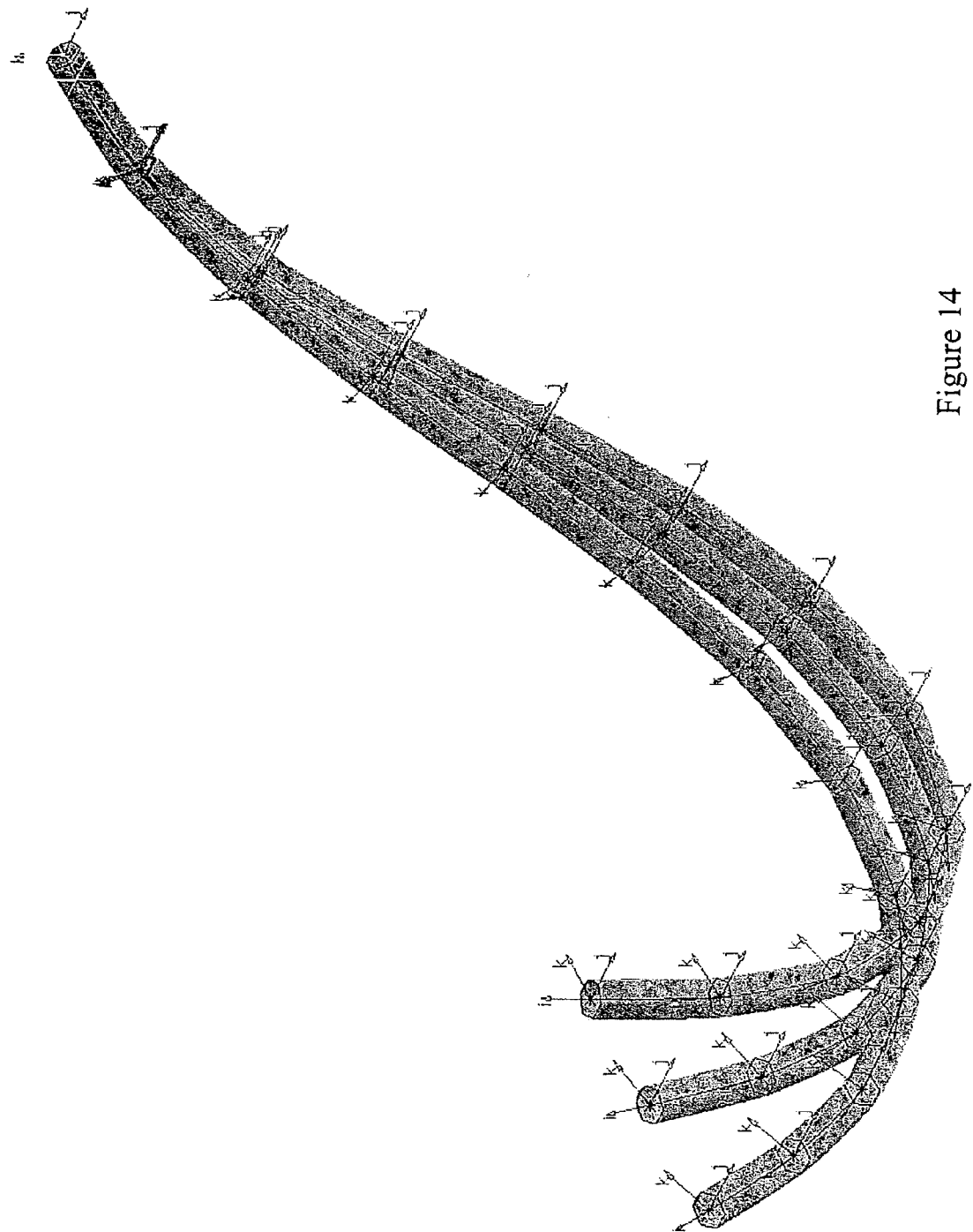
Figure 15:
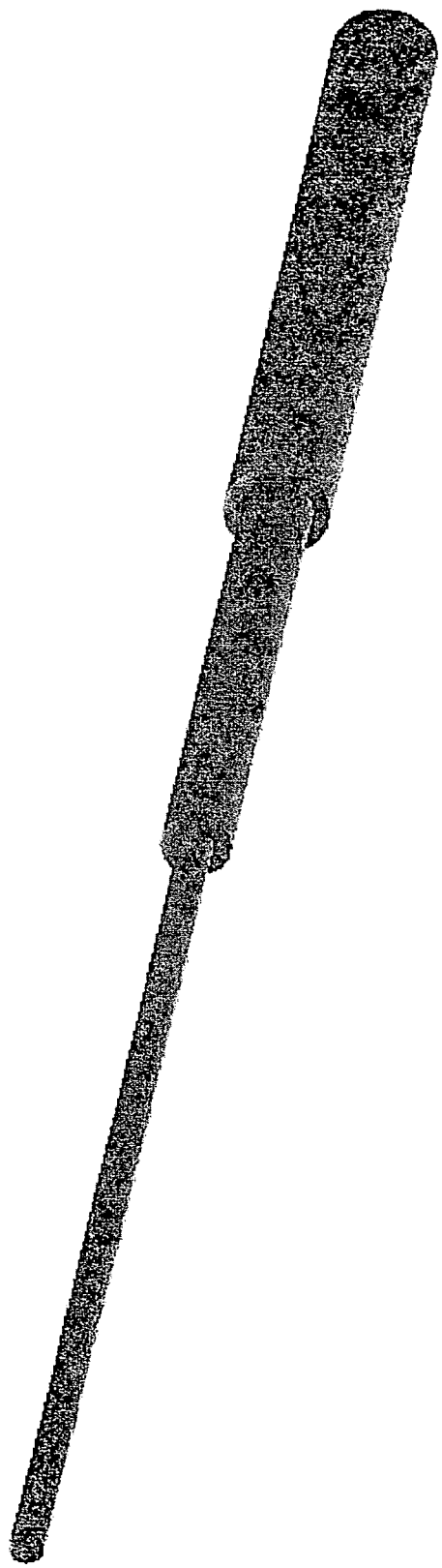
Figure 16:
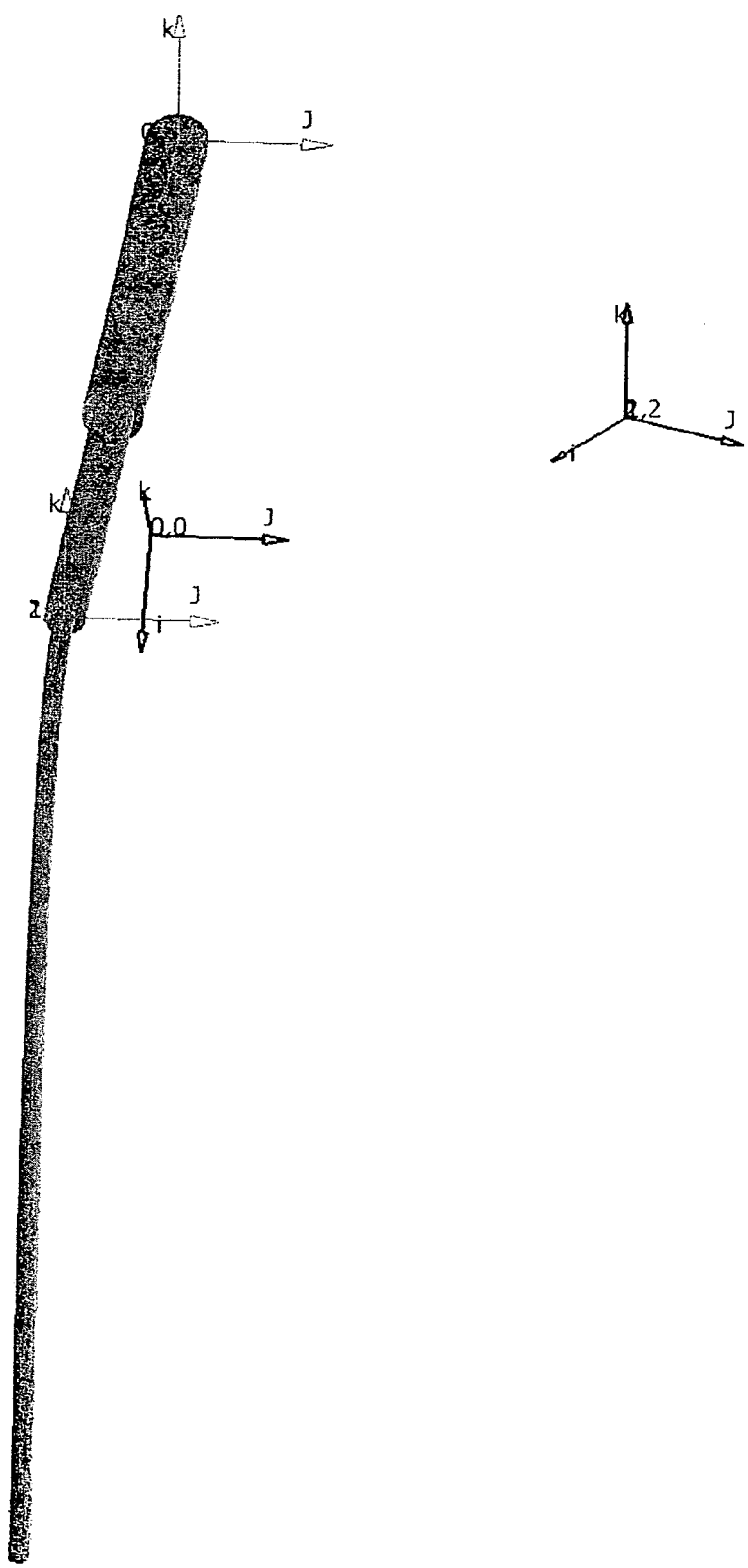
Figure 17:
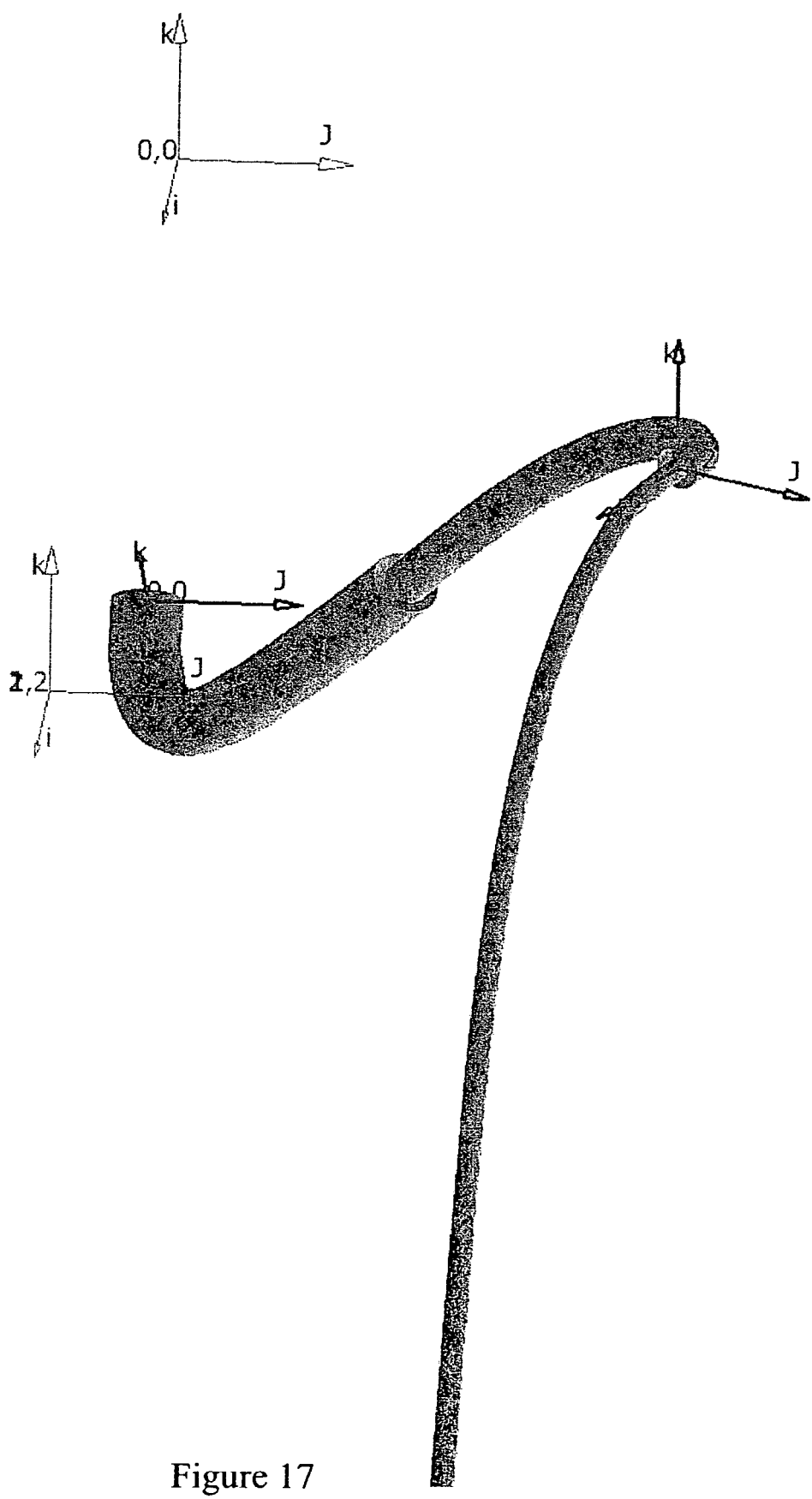
Figure 18:
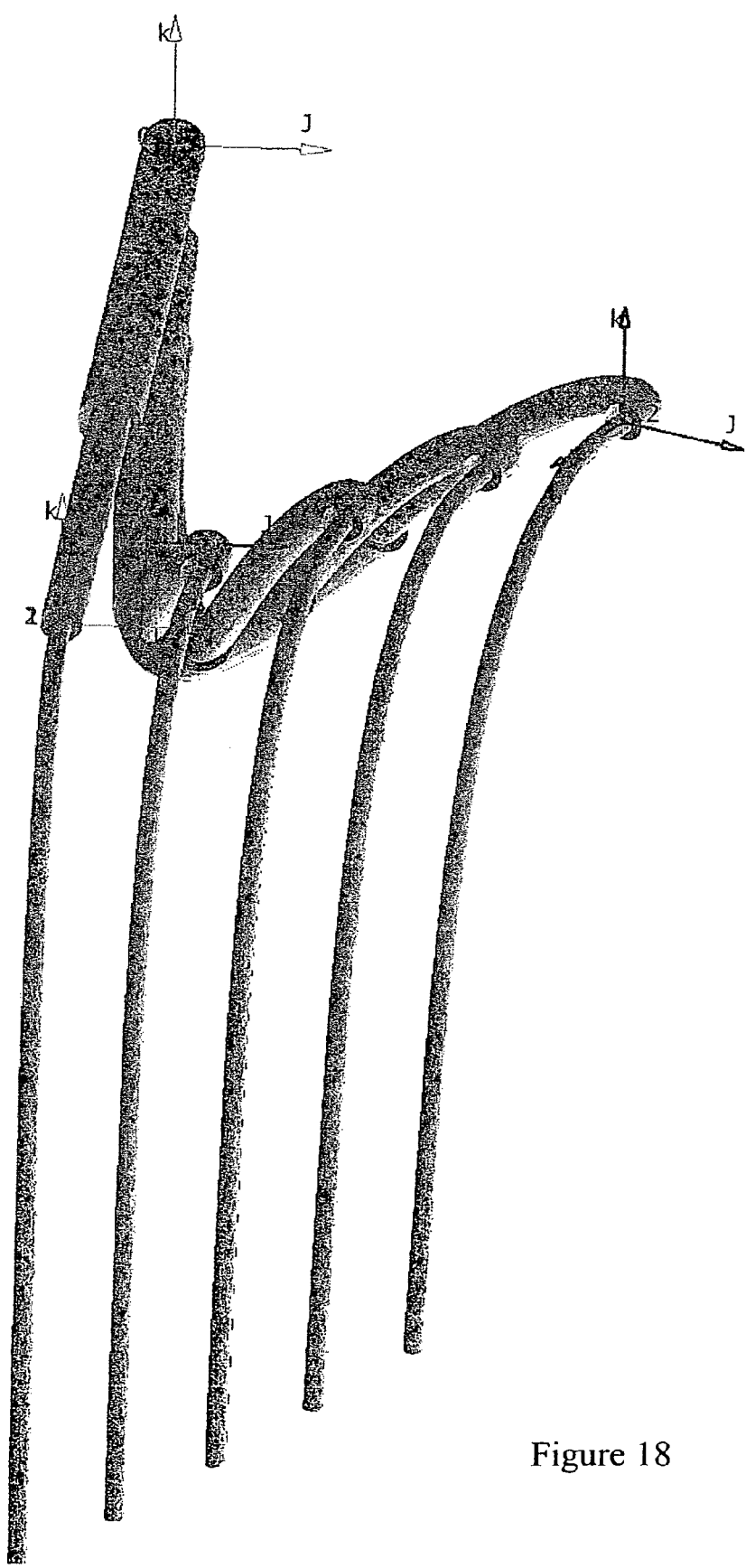
Figure 19:
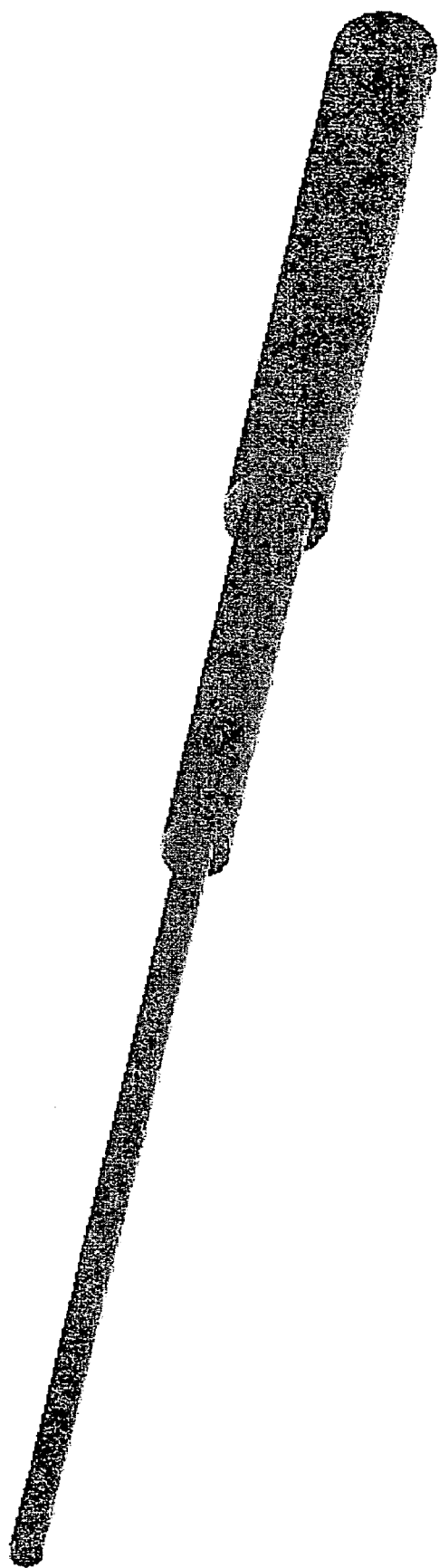
Figure 20:
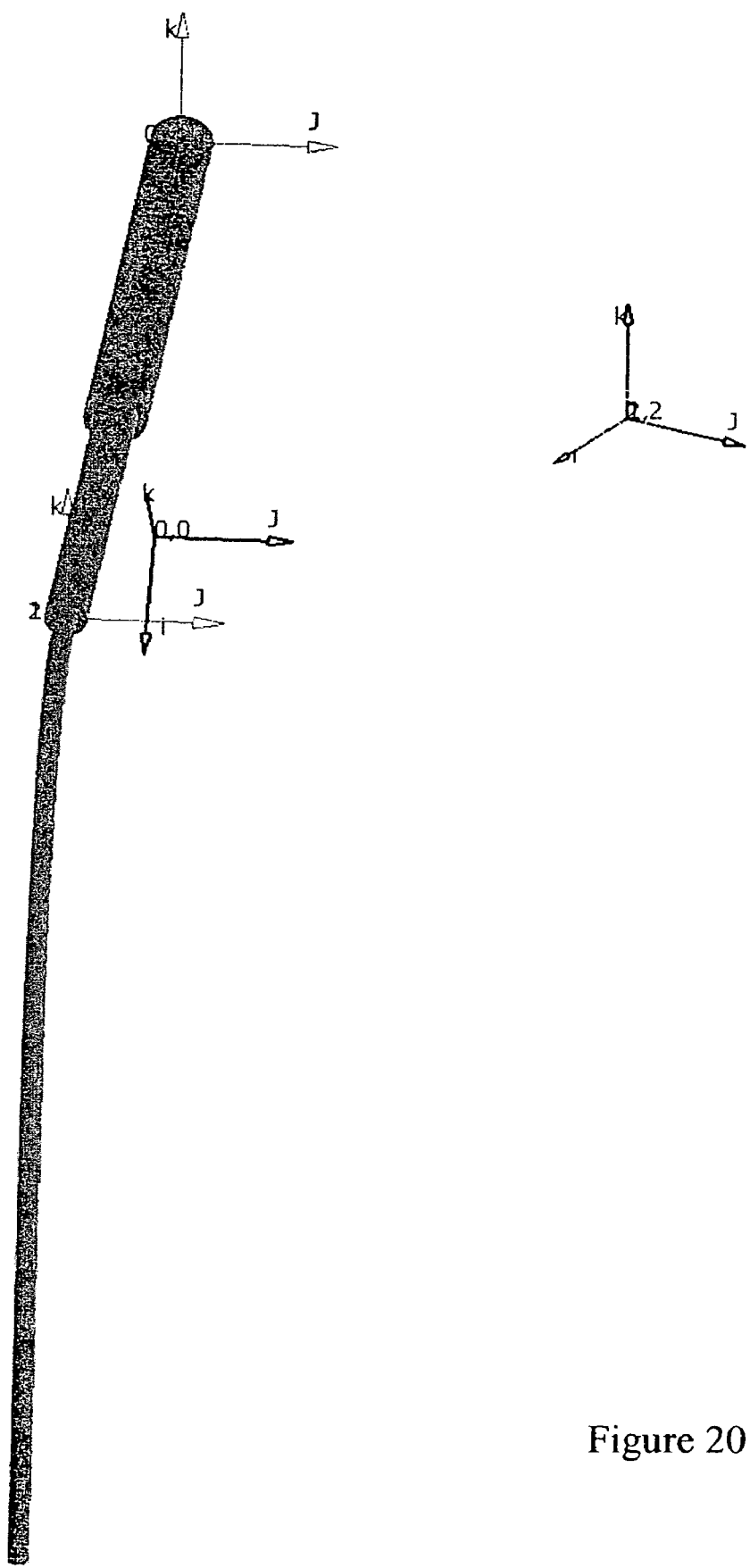
Figure 21:
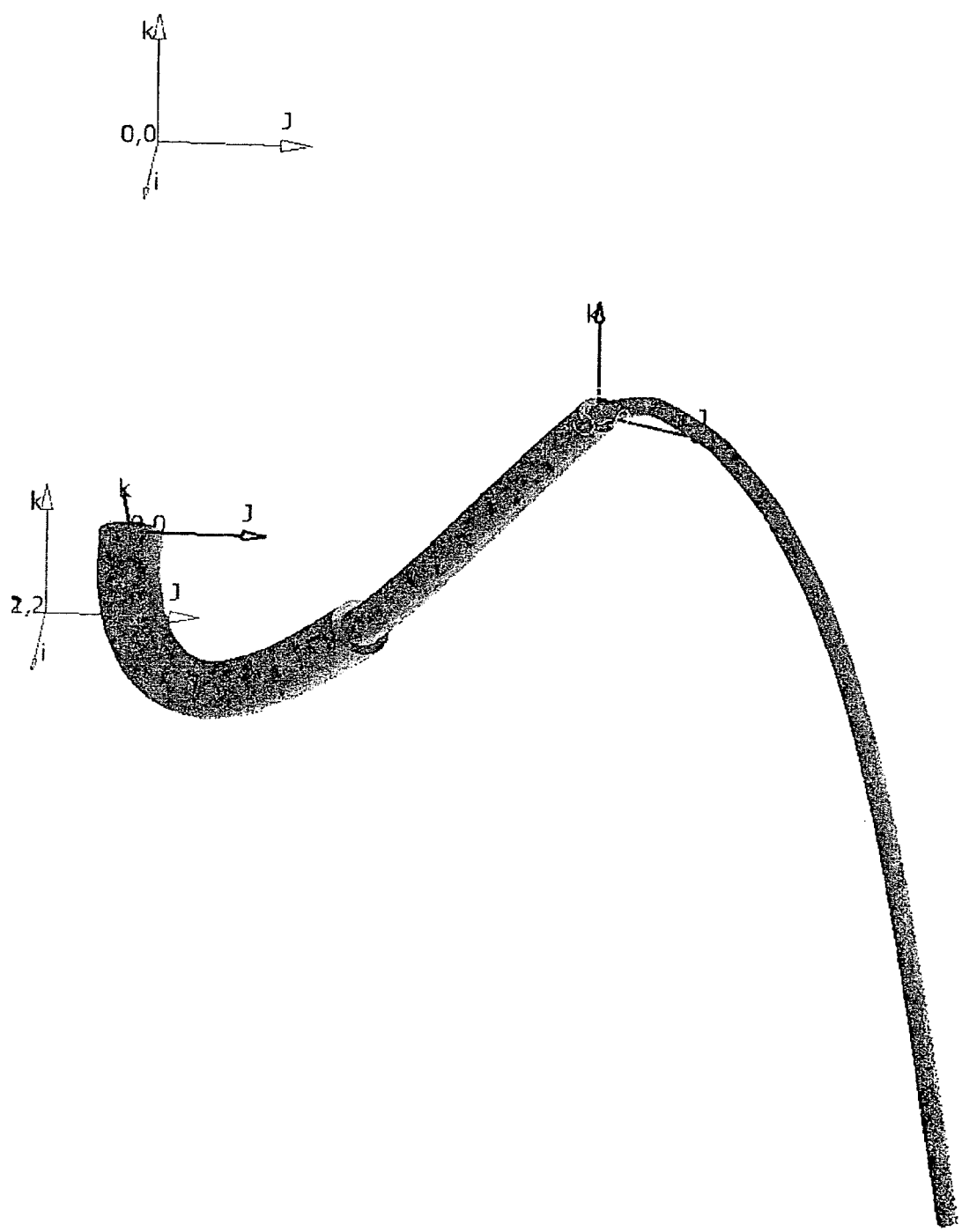
Figure 22:
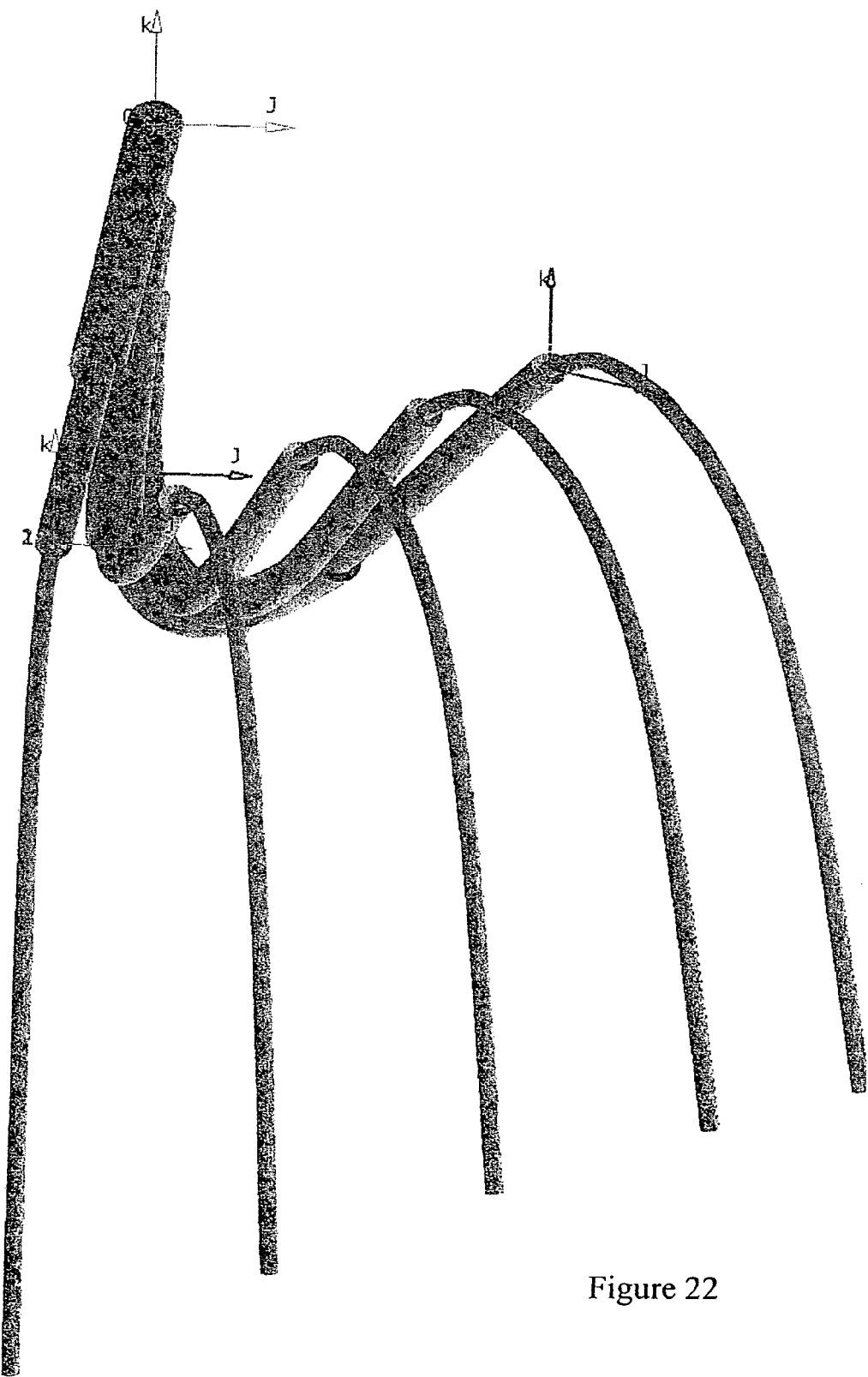

FIG. 10 shows three intermediate configurations; end point positions and orientations are interpolated, and represent a fraction of the predetermined displacement boundary conditions. Deformed shape is computed by the program.

The second example is represented in FIGS. 11 to 14. It is similar to the first example, except for the fact that the rotation degree of freedom (around a local axis orthogonal to the deformation plane) is released at the left end point, both in the initial and in the final configurations.

Full run is carried out in 0.27 sec CPU time; as in the first example, convergence is attainted in 6 iterations per increment on the average.

FIGS. 11-14 respectively correspond to FIGS. 7-10, and are not described again. As for the first example, node positions and nodal reference frames are represented in all figures.

The third example is represented in FIGS. 15 to 18. In this example, the system comprises three segments of different characteristics; one end point and one intermediate point fully are fully imposed. This appears on the figure, where one clearly sees that the slenderer section of the system is not constrained and bends downwards under the action of gravity.

Finite element analysis is carried out with a 3×12 elements model.

Full run is carried out in 6.45 sec CPU time; convergence is attained in 40 iterations per increment on the average.

FIGS. 15-18 respectively correspond to FIGS. 7-10, and as not described again. Node positions and nodal reference frames are not represented in all figures.

The fourth example is represented in FIGS. 19 to 22; this example is identical to the third example, except for the fact that all three rotation degrees of freedom are released at the intermediate point.

Full run is carried out in 5.2 sec CPU time; in each incremental step, convergence is attained in 25 iterations per increment on the average.

FIGS. 19-22 respectively correspond to FIGS. 15-18, and are not described again. Note the difference in the final configuration, due to the different constraints applied to the system.

The process is not limited to the examples provided above. For instance, in the example of FIG. 1, the predetermined displacement is considered at both ends of the flexible system. One may also consider predetermined displacement—fully constrained or not—at more than two points in the system.

In the process disclosed in reference to FIGS. 1 to 3, the co-rotational update is carried out after each incremental step—or before the next incremental step. It is also possible not to carry out the co-rotational update at each step; specifically, one may only carry out the co-rotational update when necessary, that is when the change of angle between each elementary frame of reference and the corresponding updated elementary frame of reference is higher than a predetermined value. Practically speaking, this predetermined value may be between 0 and 30 degrees with low values, e.g.: 1 sec, corresponding to quasi-systematic updating.

A scaling factor is disclosed above for controlling convergence during an incremental step; such a scaling factor could also be used for the purposes of controlling the behavior of a flexible system. For instance, applying a value of zero to the scaling factor at one given incremental step results in simulating a visco-elastic flexible system: all initial stresses are relaxed.

The various embodiments disclosed above may be combined, for a more efficient simulation of the flexible system. One may also carry out the various embodiments independently. For instance, the stopping criterion may be used independently of nodal frames. The stopping criterion discussed above may also be used independently of the co-rotational update discussed in reference to FIGS. 3 and 4; the stopping criterion could also be used for non-structural (i.e.: continuous) elements; such non-structural or continuous elements are actually "solid" elements, which do not possess nodal rotation degrees of freedom.

Last, the use of hybrid reference frames disclosed in reference to FIG. 6 may be used independently of the co-rotational update discussed previously. One could also use such hybrid reference frames also in a linear solver.

The invention claimed is:

1. A computer-implemented process for determining the behavior of a flexible system submitted to predetermined displacement boundary conditions, using geometrically non-linear finite element analysis, the process comprising a plurality of incremental steps within a total Lagrangian formalism with co-rotational update, said incremental steps being implemented using a computer system comprising at least one computer processor, wherein each incremental step comprises computing, using said at least one computer processor, for a finite element of the flexible system a displacement vector, having translational and rotational components, at the nodes of the finite element, by minimizing an energy of the flexible system when submitted to a fraction of the predetermined displacement; and wherein, for a given finite element, the co-rotational update comprises computing, using said at least one computer processor, an updated elementary frame of reference without considering the bending rotational components of the displacement vectors computed at the nodes of the finite element.

2. The process of claim 1, wherein the co-rotational update comprises computing, using said at least one computer processor, updated elementary frame of reference solely on the basis of the translational components of the displacement vectors computed at the nodes of the finite elements.

3. The process of claim 2, wherein the updated elementary frame of reference is computed with the steps of:

extracting, using said at least one computer processor, a minimal rotation necessary for bringing a line joining the nodes of the finite element on a line joined displaced nodes of the finite element; and applying, using said at least one computer processor, said minimal rotation to the elementary frame of reference of said finite element before said co-rotational update.

4. The process of claim 1, wherein the co-rotational update comprises computing, using said at least one computer processor, updated elementary frame of reference on the basis of:

a mean value of a torsional rotational component of the displacement vectors computed at the nodes of the finite element, and the translational components of the displacement vectors computed at the nodes of the finite element.

5. The process of claim 4, wherein the updated elementary frame of reference is computed with the steps of:

rotating, using said at least one computer processor, the elementary frame of reference of said finite element before said co-rotational update around an axis coinciding with the line joining the nodes, by a mean value of the torsional rotational components of the nodes;

extracting, using said at least one computer processor, a minimal rotation necessary for bringing a line joining the nodes of the finite element on a line joined displaced nodes of the finite element; and applying, using said at least one computer processor, said minimal rotation to the rotated elementary frame of reference.

6. The process of claim 1, wherein an axis of the updated elementary frame of reference coincides with a line joining nodes of displaced finite element.

7. The process of claim 1, wherein a node of a finite element is provided with a nodal frame of reference and wherein the incremental step further comprises computing, using said at least one computer processor, for a displaced node of the finite element, an updated nodal frame of reference by rotating the nodal frame of reference by the rotational components of the displacement vector at the node.

8. The process of claim 7, further comprising the step of interpolating, using said at least one computer processor, a smoothed shape for the flexible system, based on:

the positions of the nodes for the finite elements; and the nodal frames of reference.

9. The process of claim 8, further comprising a step of displaying using said computer the interpolated smooth shape.

10. The process of claim 7, wherein said minimized energy of the flexible system is a function of the difference between a nodal frame of reference at a node and an elementary frame of reference of a finite element comprising the node.

11. The process of claim 10, further comprising, during an incremental step, computing, using said at least one computer processor, at a node of finite element a rotation transforming an elementary frame of reference into the nodal frame of reference; and wherein minimized energy depends on the computed rotation.

12. The process of claim 10, wherein said minimized energy of the flexible system is a function of the product of a scaling factor by the difference between a nodal frame of reference at a node and an elementary frame of reference of a finite element comprising the node, the process further comprising changing the scaling factor from one incremental step to another incremental step.

13. The process of claim 12, wherein the scaling factor is changed manually.

14. The process of claim 12, wherein the scaling factor is changed according to a number of iterations for minimizing the energy in an incremental step.

15. The process of claim 12, wherein the scaling factor is changed according to the difference between an elementary frame of reference for a finite element and the nodal frames of reference for the finite element.

16. The process of claim 1, wherein the step of minimizing the energy is carried out iteratively and comprises:

computing, using said at least one computer processor, a scalar product of a residual and of a displacement variation; and stopping the iterations according to a value of the scalar product.

17. The process of claim 1, wherein the predetermined displacement boundary conditions include at least one degree of freedom release at one node of the flexible system, wherein the step of minimizing is carried out, for a node having a released degree of freedom, in a local frame of reference, and wherein a released degree of freedom at said node is expressed along one axis of the local frame of reference.

18. A computer-readable storage medium comprising storage instructions that when executed by a computer cause the computer to implement a process for determining the behavior of a flexible system submitted to predetermined displacement boundary conditions, using geometrically non-linear finite element analysis, the process comprising a plurality of incremental steps within a total Lagrangian formalism with co-rotational update, wherein each incremental step comprises computing for a finite element of the flexible system a displacement vector, having translational and rotational components, at the nodes of the finite element, by minimizing an energy of the flexible system when submitted to a fraction of the predetermined displacement; and wherein, for a given finite element, the co-rotational update comprises computing an updated elementary frame of reference without considering the bending rotational components of the displacement vectors computed at the nodes of the finite element.

* * * * *